(12) United States Patent
Biswas et al.

(10) Patent No.: US 12,309,004 B1
(45) Date of Patent: May 20, 2025

(54) DECISION FEEDBACK EQUALIZATION TAP NETWORK

(71) Applicant: Cadence Design Systems, Inc., San Jose, CA (US)

(72) Inventors: Riju Biswas, Noida (IN); Nitin Kumar, Uttar Pradesh (IN)

(73) Assignee: Cadence Design System, Inc., San Jose, CA (US)

( * ) Notice: Subject to any disclaimer, the term of this patent is extended or adjusted under 35 U.S.C. 154(b) by 76 days.

(21) Appl. No.: 18/304,612

(22) Filed: Apr. 21, 2023

(51) Int. Cl.
*H04L 25/03* (2006.01)

(52) U.S. Cl.
CPC ............................... *H04L 25/03057* (2013.01)

(58) Field of Classification Search
CPC ........... H04L 25/0294; H04L 25/03006; H04L 25/03019; H04L 25/03057; H04L 25/03076; H04L 25/03146; H04L 25/03267
USPC ......... 375/232, 233; 333/28 R; 708/322, 323
See application file for complete search history.

(56) References Cited

U.S. PATENT DOCUMENTS

| | | | |
|---|---|---|---|
| 9,231,793 B1* | 1/2016 | Vareljian | H04L 25/03057 |
| 9,369,313 B1* | 6/2016 | Yu | H03F 1/0205 |
| 2010/0202506 A1* | 8/2010 | Bulzacchelli | H04L 25/03267 |
| | | | 375/233 |
| 2012/0313703 A1* | 12/2012 | Agrawal | H03F 3/211 |
| | | | 330/253 |
| 2013/0214865 A1* | 8/2013 | Bulzacchelli | H03K 19/018528 |
| | | | 330/261 |
| 2016/0142233 A1* | 5/2016 | Mobin | H04L 25/03878 |
| | | | 375/232 |

* cited by examiner

*Primary Examiner* — Young T. Tse
(74) *Attorney, Agent, or Firm* — Mark H. Whittenberger; Holland & Knight LLP

(57) ABSTRACT

The present disclosure relates to an apparatus and method for decision feedback equalization. Embodiments include a sum amplifier having a differential tap network architecture wherein the sum amplifier includes at least one resistor, at least one transistor, and at least one source node, wherein the at least one source node is directly connected to a complete tap network.

18 Claims, 24 Drawing Sheets

| Case | Sampler output | Tap Sign |
|---|---|---|
| 1 | 1 | 1 |
| 2 | 1 | -1 |
| 3 | -1 | 1 |
| 4 | -1 | -1 |

FIG. 10

| X (decimal) | x | Tapp[16+x] | Tapp[16+x] Decimal | Tapm[16-x] |
|---|---|---|---|---|
| 0 | 0000 0000 0000 0000 | 0000 0000 0000 0000 0000 1111 1111 | 16 | 0000 0000 0000 0000 0000 1111 1111 1111 1111 |
| 1 | 0000 0000 0000 0001 | 0000 0000 0000 0000 0001 1111 1111 1111 1111 | 17 | 0000 0000 0000 0000 0000 0111 1111 1111 1111 |
| 2 | 0000 0000 0000 0011 | 0000 0000 0000 0000 0011 1111 1111 1111 1111 | 18 | 0000 0000 0000 0000 0000 0011 1111 1111 1111 |
| 3 | 0000 0000 0000 0111 | 0000 0000 0000 0000 0111 1111 1111 1111 1111 | 19 | 0000 0000 0000 0000 0000 0001 1111 1111 1111 |
| 4 | 0000 0000 0000 1111 | 0000 0000 0000 0000 1111 1111 1111 1111 1111 | 20 | 0000 0000 0000 0000 0000 0000 1111 1111 1111 |
| 8 | 0000 0000 1111 1111 | 0000 0000 1111 1111 1111 1111 1111 | 24 | 0000 0000 0000 0000 0000 0000 0000 1111 |
| 16 | 1111 1111 1111 1111 | 1111 1111 1111 1111 1111 1111 1111 | 32 | 0000 0000 0000 0000 0000 0000 0000 0000 |

| Tapm[16-x] Decimal | SA_outp | SA_outm | SA_outp-SA_outm | Sum amp output Common mode |
|---|---|---|---|---|
| 16 | VDD-16*Itapunit*RL-Icm*RL | VDD-16*Itapunit*RL-Icm*RL | 0 | VDD-16*Itapunit*RL-Icm*RL |
| 15 | VDD-15*Itapunit*R-Icm*RL | VDD-17*Itapunit*RL-Icm*RL | 2*Itapunit*RL | VDD-16*Itapunit*RL-Icm*RL |
| 14 | VDD-14*Itapunit*RL-Icm*RL | VDD-18*Itapunit*RL-Icm*RL | 2*2*Itapunit*RL | VDD-16*Itapunit*RL-Icm*RL |
| 13 | VDD-13*Itapunit*RL-Icm*RL | VDD-19*Itapunit*RL-Icm*RL | 2*3*Itapunit*RL | VDD-16*Itapunit*RL-Icm*RL |
| 12 | VDD-12*Itapunit*RL-Icm*RL | VDD-20*Itapunit*RL-Icm*RL | 2*4*Itapunit*RL | VDD-16*Itapunit*RL-Icm*RL |
| 8 | VDD-8*Itapunit*RL-Icm*RL | VDD-24*Itapunit*RL-Icm*RL | 2*8*Itapunit*RL | VDD-16*Itapunit*RL-Icm*RL |
| 0 | VDD-Icm*RL | VDD-32*Itapunit*RL-Icm*RL | 2*16*Itapunit*RL | VDD-16*Itapunit*RL-Icm*RL |

FIG. 17 CONTINUED

| x | Signp | Signm | Voutp | Voutm | Smp_p | Smp_m | SA_outp | SA_outm |
|---|---|---|---|---|---|---|---|---|
| 0 | Z | Z | X | X | VDD | 0 | VDD-(Icm+16*Itapunit)*RL | VDD-(Icm+16*Itapunit)*RL |

FIG. 19A

| x | Signp | Signm | Voutp | Voutm | Smp_p | Smp_m | SA_outp | SA_outm |
|---|---|---|---|---|---|---|---|---|
| 0 | Z | Z | X | X | VDD | 0 | VDD-(Icm+16*Itapunit)*RL | VDD-(Icm+16*Itapunit)*RL |

2202 — providing a sum amplifier having a differential tap network architecture wherein the sum amplifier includes at least one resistor, at least one transistor, and a source node 2204 — directly connecting the source node to a complete tap network

FIG. 22

DECISION FEEDBACK EQUALIZATION TAP NETWORK

FIELD OF THE INVENTION

The present disclosure relates to serializer/deserializer systems (e.g., GDDR6 SerDes), and more specifically, to a tap network design.

DISCUSSION OF THE RELATED ART

Atypical computing device is implemented with a microprocessor, memory, and a number of other modules depending on the function to be performed by the computing device. DDR random access memory (RAM) is a particular type of RAM commonly used in current technology that performs two read accesses or two write accesses per clock cycle. Microprocessors and DDR RAM both operate on various power supply voltages. Interface circuits that can convert between different signal levels and different drive levels may be used to allow for compatible communications between microprocessors and memory devices.

Serializer/deserializer (SerDes) components are becoming common on integrated System-on-a-chip (SOC) and Application Specific Integrated Circuits (ASICs). The higher demand of high-speed wide-band data rates may require high-speed serial data links (or TX/RX links) that are widely used for sending data over various media, such as cables, board traces and/or backplanes. These media are often referred to as channels.

Intersymbol Interference (ISI) is a major source of error in high-speed communication applications. Equalizers may be applied to both transmitters and receivers of such links to reduce or eliminate the effect of ISI. Among these equalizers, decision feedback equalization (DFEs) may be used. A DFE stores and feeds back the decisions that the DFE has made for previously received bits and subtracts the ISI of these stored bits from a present signal characterizing a current received bit. In some examples, a DFE may be programmed to offset (e.g., undo or mitigate) an effect of a channel (e.g., a transmission line).

In DFE, taps may be used to equalize the channel loss and improve the "eye". Based on the channel loss at data speed (based on generation), the number of taps is decided, and this number of taps may increase with higher data speeds and higher channel loss. Generally, three taps are used for PCIe Gen3, four to six taps are used for PCIe Gen4, and more than six taps are used for PCIe Gen5. These taps may include current steering digital to analog converters (DACs) which may be controlled by the data sampler and adaptation algorithm. For example, in PCIe Gen3, Tap1 has the maximum weighting and Tap3 has the minimum. Tap1 has the minimum settling time (one sampling period) and Tap3 has the maximum sampling time (e.g., three sampling periods).

SUMMARY

In one or more embodiments of the present disclosure, a decision feedback equalization circuit is provided. The circuit may include a sum amplifier having a differential tap network architecture. The sum amplifier may include at least one resistor, at least one transistor, and at least one source node, wherein the at least one source node is directly connected to a complete tap network.

One or more of the following features may be included. The at least one source node may be configured to allow a common mode current to flow therethrough for a plurality of modes. The sum amplifier may not include a common mode feedback loop. The sum amplifier may be configured to maintain activity of the complete tap network differentially. The one or more sign detection switches may be configured to generate an output and the output may be received at one or more latches. The complete tap network may include a plurality of current sources. The complete tap network may include multiple taps wherein each tap is controlled using 16 or 32 thermometric bits. The complete tap network may include at least 3 taps. Each tap of the tap network may include a digital to analog converter.

In one or more embodiments of the present disclosure, a decision feedback equalization method is provided. The method may include providing a sum amplifier having a differential tap network architecture wherein the sum amplifier includes at least one resistor, at least one transistor, and at least one source node. The method may further include directly connecting the at least one source node to a complete tap network.

One or more of the following features may be included. The at least one source node may be configured to allow a common mode current to flow therethrough for a plurality of modes. The sum amplifier may not include a common mode feedback loop. The sum amplifier may be configured to maintain activity of the complete tap network differentially. The method may further include generating an output at one or more sign detection switches. The output may be received at one or more latches. The complete tap network may include a plurality of current sources. The method may also include controlling one or more taps using 16 or 32 thermometric bits. The complete tap network may include at least 3 taps. Each tap of the tap network may include a digital to analog converter.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description explain the principles of embodiments of the invention.

FIG. 10 is a table showing example inputs that are controlling taps consistent with an embodiment of the present disclosure;

FIG. 17 is a table an example implementation for 32 thermometric bits for Tap2 consistent with an embodiment of the present disclosure;

FIG. 19A is a table showing the node status when dfe_equalization is disabled and enabled consistent with an embodiment of the present disclosure;

FIG. 19B is another table showing the node status when dfe_equalization is disabled and enabled consistent with an embodiment of the present disclosure;

FIG. 22 is a flowchart consistent with an embodiment of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 1:
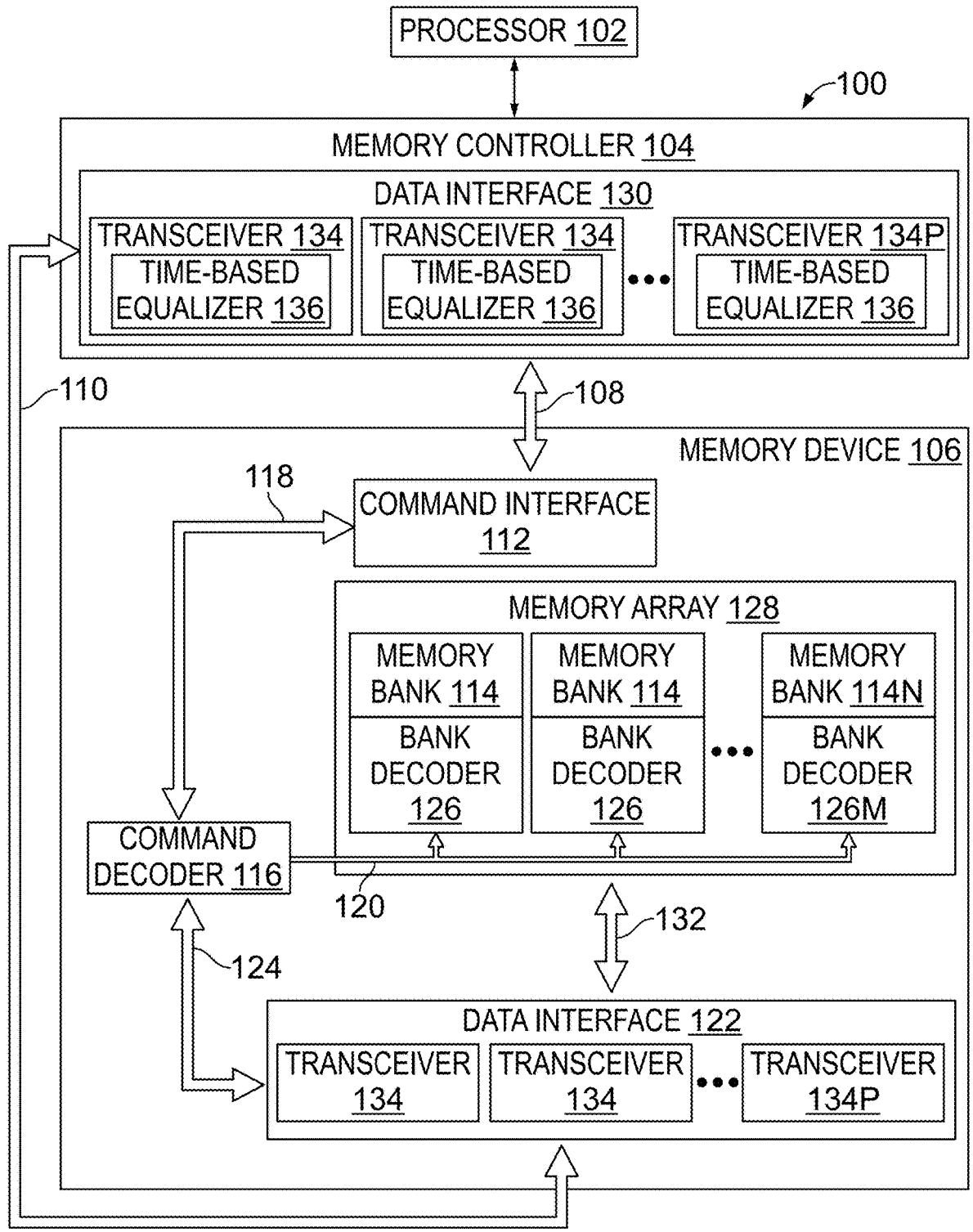
FIG. 1 is a block diagram of an example system in which the present embodiments may find useful application.

FIG. 1 illustrates an example of a computing system 100. The computing system 100 may include processor 102. Processor 102 may represent a processing unit of a host device that may execute an operating system (OS) and applications, which may collectively be referred to as a "host." The OS and applications may execute operations that may result in memory accesses. Exemplary host devices may include, but are not limited to, a desktop computer, a laptop computer, a cellular phone, a personal organizer, a portable audio player, a tablet, a control circuit, a camera, a smart watch, a virtual reality headset, a network node, such as a router or a server, a copier, a scanner, a printer, a game console, a television, a set-top video distribution or a recording system, a cable box, a personal digital media player, a factory automation system, an automotive computer system, or a medical device. In other examples, a different type of host device may be employed for implementing features and functions of the computing system 100, as described herein. In some examples, processor 102 may include one or more separate processors. Each separate processor may include a single or a multicore processing unit. In some examples, the processing unit may be a primary processor, such as a central processing unit (CPU) or a peripheral processor, such as a graphics processing unit (GPU). In some examples, the computing system 100 may be implemented as a system on chip (SOC) or be implemented with standalone components.

In some embodiments, computing system 100 may include memory controller 104. By way of example, memory controller 104 is illustrated as separate from the processor 102 in the example of FIG. 1. However, in other examples, processor 102 may include memory controller 104. Thus, in some examples, memory controller 104 may be part of processor 102, such as logic implemented on a same die or implemented in a same package space as the processor 102. Memory controller 104 may be representative of one or more controller circuits or devices for the computing system 100. Memory controller 104 may include or represent control logic that generates memory access commands in response to the execution of operations by the processor 102. Memory controller 104 may be configured to communicate with a memory device 106. In some examples, each memory controller 104 may communicate with a given memory device 106. In other examples, each memory controller 104 may communicate with one or more memory devices 106.

In some embodiments, each memory controller 104 may be configured to manage a separate memory channel, although the computing system 100 may be configured to have multiple channels managed by a single memory controller 104 or to have multiple memory controllers 104 on a single channel. By way of further example, memory controller 104 may include drivers, receivers, transmitters, transceivers (e.g., a transceiver 134), termination, and/or other circuitry to send or receive signals on signal lines coupling the memory controller 104 and memory device 106. A grouping of signals lines (e.g., signal paths, including pins, pads, connectors and/or conductive traces or wires)) may be referred to as a bus. In other examples, a given signal line may be referred to as a bus. Memory controller 104 and the memory device 106 may include pins, pads, connectors, traces, wires, and/or other hardware to connect these devices to each other. In some examples, wires within an integrated circuit interface may be configured to couple a pad, pin, or connector to enable interfacing of signal lines or traces or other wires between memory controller 104 and memory device 106.

In some embodiments, a group of signal lines may be implemented between memory controller 104 and memory device 106 and grouped to provide a command bus 108. Command bus 108 may include an address bus and a control bus. Memory controller 104 may be configured to communicate a clock signal and a command (e.g., a read or write command) via command bus 108 to memory device 106. In other examples, clock signal may be provided from an external device (e.g., from the processor 102 or another device). Address locations (e.g., address registers) to be accessed during the read and/or write commands may be communicated by memory controller 104 via the address bus to memory device 106. Thus, command bus 108 may be employed by memory controller 104 to communicate the clock signal, commands, and address locations for implementing read and write actions at the memory device 106. In some embodiments, a group of signals lines may be employed to provide a data bus 110 between memory controller 104 and memory device 106. Data may be sent to and from memory device 106 via data bus 110 based on the commands, the clock signal and the address locations provided via command bus 108 from memory controller 104.

In some embodiments, command bus 108 may be of a given bus width, such as to accommodate commands and addresses of a particular size. For example, command bus 108 may be a 14-bit bus, such that command bus 108 may accommodate command and/or address signals that are 14 bits in length. In some embodiments, a command interface 112 of memory device 106 may be configured to receive a chip select signal. The chip select signal may enable the memory device 106 to process commands on the incoming command and/or address signals. Access to a particular memory bank (e.g., a memory bank 114) within memory device 106 may be encoded onto the 14-bit bus with the commands. In some embodiments, the command interface 112 of memory device 106 may be configured to receive a number of other command signals.

For example, a command and/or address on die termination signal may be provided to facilitate proper impedance matching within memory device 106. A reset command signal may be used to reset the command interface 112, status registers, state machines, etc., such as during power-up of the memory device 106. In some embodiments, command interface 112 may be configured to receive a command and/or address invert signal to invert the state of command and/or address signals on command bus 108 based on the command and/or address routing for the memory device 106. In some embodiments, a mirror signal may be received at command interface 112 to facilitate a mirror function. The mirror signal may be used to multiplex signals, such that the signals can be swapped and thus enable certain routing of signals to memory device 106, based on the configuration of multiple memory devices in a particular application. Various signals to facilitate testing of memory device 106, such as a test enable signal, may be provided to the command interface 112, in some examples. For example, the test enable signal may be used to place memory device 106 into a test mode for connectivity testing or determining characteristics of a communication channel for ISI compensation, as described herein. In some embodiments, the command interface 112 may be used to provide an alert signal to processor 102 or memory controller 104 in response to errors being detected at memory device 106. For example, an alert signal may be transmitted from memory device 106 in response to a cyclic redundancy check error being detected. Other alert signals may also be generated.

In some embodiments, memory device 106 may be implemented as a memory module (e.g., a board). By way of example, memory device 106 may be implemented as a dual in-line memory module (DIMM). In additional or alternative examples, memory device 106 may be implemented as a double data rate type (DDR) device. Thus, in some embodiments, memory device 106 may be implemented as a double data rate 3 (DDR3) device, a double data rate 4 (DDR4) device, a low power DDR3 (LPDDR3) device, a low power DDR4 (LPDDR4) device, a Wide I/O 2 (WIO2) device, a high bandwidth memory (HBM) dynamic random-access memory (DRAM) device, a HBM 2 DRAM (HBM2 DRAM) device, a double data rate 5 (DDR5) device or a low power DDR5 (LPDDR5) device (e.g., a mobile DDR device), a graphics double data rate 6 (GDDR6) device, etc.

In some embodiments, each memory device 106 may be organized and managed as different channels, where each channel couples to buses and signal lines that couple to multiple memory devices 106 in parallel. Each channel may be independently operable. Thus, each channel may be independently accessed and controlled, and the timing, data transfer, command and address exchanges, and other operations can be separate for each channel. As used herein, coupling can refer to an electrical coupling, communicative or a physical coupling. Physical coupling may include direct contact. Electrical coupling may include an interface or interconnection that can allow electrical flow and/or signaling between components or devices. Communicative coupling may include connections, including wireless, that enable components to exchange data. In some embodiments, the computing system 100 may employ any of the protocols described herein as well as any communication protocol that may be employed for data read and write operations.

In some embodiments, memory device 106 may include N number of memory banks 114, wherein N is an integer equal to or greater to one. In some examples, the memory banks 114 may be implemented as DDR5 SDRAM memory banks. In further examples, the memory banks 114 may be provided on one or more chips (e.g., SDRAM chips) that may be arranged on DIMMs. Each DIMM may include a K number of data interfaces of SDRAM memory chips, wherein K is an integer greater than or equal to two. In some examples, each DIMM may include ×4, ×8, ×16, and ×32 data interfaces. As such, in some examples, the memory device 106 may represent a portion of a single memory chip (e.g., SDRAM chip) that may have a given number of memory banks 114. In some examples, the memory banks 114 may be arranged into bank groups. For example, for an 8 gigabit (Gb) DDR5 SDRAM, the memory device 106 may include 16 memory banks 114 that may be arranged into 8 bank groups, wherein each bank group may include 2 memory banks. By way of further example, for a 16 GB DDR5 SDRAM, the memory device 106 may include memory banks 114 that may be arranged into 8 bank groups, wherein each bank group can include 4 memory banks. Various other configurations, organization and sizes of the memory banks 114 on the memory device 106 can be utilized or implemented.

In some examples, memory device 106 may include command interface 112. Command interface 112 may be configured to receive the clock signal and the commands (e.g., read and write commands) from command bus 108. Thus, command interface 112 may be coupled to the command bus 108. In examples wherein memory device 106 is implemented as a DDR device, such as a DDR5 memory device, a differential pair of clock signals may be communicated via command bus 108 from memory controller 104 to memory device 106. In some examples, the differential pair of clock signals may include a true clock signal and a complementary clock signal. Command interface 112 may be configured to generate an internal clock signal and supply the internal clock to various components within memory device 106 based on the differential pair of clock signals, such as for processing of the commands.

In some embodiments, memory device 106 may include a command decoder 116. Command decoder 116 may be configured to receive the command from command interface 112 via decoder access bus 118. A command signal may be generated by command interface 112 based on the command received from command bus 108. Thus, command decoder 116 may be configured to decode commands, such as read commands, write commands, mode-register set commands, activate commands, etc., and provide access via a bank access bus 120 to a particular memory bank 114 corresponding to the command. Thus, command decoder 116 may be configured to receive the commands via decoder access bus 118 and decode the commands to provide decoded commands for various internal control of memory device 106. For example, command decoder 116 may be configured to provide a decoded command signal to an internal clock generator of memory device 106 (not shown in FIG. 1) over a communication bus (not shown in FIG. 1) to coordinate generation of a phase controlled internal clock signal based on the clock signal received via the command bus 108. The phase controlled internal clock signal may be generated by a delay locked loop (DLL) circuit of memory device 106 (not shown in FIG. 1). The phased controlled internal clock signal may be supplied to a data interface 122 of memory device 106 via a data interface bus 124 and may be used as a timing signal for determining an output timing of read data from memory banks 114. Thus, the phased controlled internal clock signal may be used to clock data through data interface 122 of memory device 106, such as described herein.

In some examples, each memory bank 114 may be associated with a respective bank decoder 126 that may be configured to provide decoding (e.g., row and column decoding), as well as other features, such as timing control and data control, to implement the execution of the commands to and from memory banks 114 based on the decoded commands provided via bank access bus 120 to respective bank decoders 126 from command decoder 116. In some examples, each memory bank 114 may be associated with a corresponding bank decoder 126. Thus, memory device 106 may include an M number of bank decoders 126, wherein M is an integer greater than or equal to one. In some examples, memory banks 114 and bank decoders 126 may define (e.g., form) a memory array 128, as illustrated in FIG. 1.

In some embodiments, memory device 106 may include various other components, such as power supply circuits (for receiving external VDD and VSS signals), mode registers (e.g., to define various modes of programmable operations and configurations), read/write amplifiers (e.g., to amplify signals during read/write operations), temperature sensors (e.g., for sensing temperatures of the memory device 106). As described herein, data may be written to and read from memory device 106, for example, by memory controller 104, whereby memory device 106 may operate as volatile memory, such as DDRAM (e.g., DDR5 SDRAM). In some examples, computing system 100 may include non-volatile memory (not shown in FIG. 1), such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), Secure-Digital (SD) cards, CompactFlash (CF) cards, or any other suitable device.

In some embodiments, computing system 100 may include one or more external interfaces, such as a Universal Serial Bus (USB), a Peripheral Component Interconnect (PCI), a PCI Express (PCI-E), a Small Computer System Interface (SCSI), an IEEE 1394 (Firewire), or any other suitable interface as well as one or more input devices to allow a user to provide data into computing system 100, for example, buttons, switching elements, a keyboard, a light pen, a stylus, a mouse, and/or a voice recognition system, for example. In some embodiments, computing system 100 may include an output device, such as a display coupled to processor 102 and a network interface device, such as a Network Interface Card (NIC), for interfacing with a network, such as an Internet. As such, computing system 100 may include many other components, depending on the application of computing system 100. For purposes of brevity and clarity these other components have been omitted with respect to FIG. 1.

In some embodiments, to send data to and from memory device 106 based on the commands and addresses received at command interface 114 and the clock signal, memory device 106 may employ data interface 122. Data interface 122 may be configured to send or retrieve the data from memory banks 114 over a local memory bus 132. Local memory bus 132 may correspond to a bi-directional data bus. Thus, in some examples, local memory bus 132 may be referred to as a local bi-directional data bus. Data interface 122 may be configured to receive data signals via data bus 110 from a data interface 130 of memory controller 104 and provide the received data signals via local memory bus 132 to memory banks 114. Thus, memory controller 104 may employ data interface 130 to send data to and from memory controller 104, such as based on signaling received from processor 102. In examples wherein memory device 106 is implemented as a DDR5 SDRAM memory device, the data signals may be referred to as DQ signals. In these examples, the DQ signals may be divided into upper and lower DQ signals corresponding to upper and lower bytes of the data signals. For example, for an x16 memory device, the DQ signals may be divided into upper and lower I/O signals, wherein a first 8 bits correspond to the upper bytes and the remaining 8 bits correspond to the lower bytes.

In some embodiments, to allow for higher data rates within memory device 106, memory device 106 may be configured to utilize data strobe signals referred to as DQS signals. The DQS signals may be driven by processor 102 or memory controller 104 sending the data (e.g., for a write command) or by the memory device 106 (e.g., for a read command). In some embodiments, for read commands, the DQS signals may be additional data DQ signals with a predetermined pattern, and thus may be sent via the data bus 110 (e.g., a subset of signal lines of the grouping of signal lines defining the data bus 110). For write commands, the DQS signals may be used as clock signals to capture the corresponding input DQ signal to memory device 106. In some embodiments, the DQS signals may be provided as a differential pair of DQS signals to provide differential pair signaling during reads and writes with respect to the memory device 106. In further examples, the differential pairs of DQS signals may be divided into upper and lower data strobe signals corresponding to upper and lower bytes of data sent to and from memory device 106, such as in DDR5 SDRAM memory implemented devices.

In some embodiments, each of data interfaces 122, 130 may include a P number of transceivers 134, wherein P is a number equal to a bus width of data bus 110. Each signal line (e.g., transmission line or channel) of data bus 110 may have an associated transceiver 134. Thus, a 14-bit bus having 14 sign lines may have 14 transceivers 134, wherein each transceiver 134 may be associated with a given signal line of the 14 signal lines defining (e.g., forming) the data bus 110. The data signals (e.g., DQ data signals) generated by memory controller 104 may be provided via respective signal lines of data bus 110 to corresponding transceivers 134 of data interface 122, such as during a data write operation. In some embodiments, the data signals generated by memory device 106 may be provided via respective signals lines of data bus 110 to corresponding transceivers 134 of data interface 130, such as during a data read operation. In some embodiments, at least some of the corresponding transceivers 134 may be coupled via a DQ connector to a respective signal line of data bus 110 to receive the respective the DQ data signals. The DQ connector may include a pin, a pad, or any type of interface that may operate to receive DQ data signals, such as for example, for transmission of DQ data signals to memory array 128 during the data write operation. In some embodiments, the DQ connector may be employed to transmit the DQ data signals from memory device 106, for example, such as during a data read operation. In some embodiments, at least some of transceivers 134 may be configured to receive one or more DQS signals to operate in strobe data mode, such as part of the data write operation.

In some embodiments, the DQS signals may be received at a DQS connector (e.g., a pin, pad, the combination thereof, etc.) of data interface 122 and routed to the corresponding transceiver 134 of data interface 122 via a DQS transceiver (not shown in FIG. 1) that may be configured to control a data strobe mode via selective transmission of the DQS signals to the corresponding transceiver 134. Thus, in some examples, the corresponding transceiver 134 of data interface 122 may be configured receive DQS signals to control the data write operation to memory array 128. As such, in some examples, each transceiver 134 of data interface 122 may be configured to operate in modes to facilitate the transfers of DQ data (e.g., the DQ data signals) to and from memory array 128. In some embodiments, to allow for higher data rates within memory device 106, each transceiver 134 may be configured to operate in a data strobe mode in which DQS signals may be employed. The DQS signals may be driven by processor 102 or memory controller 104 sending the data (e.g., for a write command) as received by the DQS connector. In some embodiments, the DQS signals may be used as clock signals to capture corresponding DQ data.

In some embodiments, each transceiver 134 of data interface 122 may include a serializer-deserializer (not shown in FIG. 1). The serializer-deserializer may be configured to translate serial data bits (e.g., a serial bit stream) on a respective signal line into parallel data bits (e.g., a parallel bit stream) for transmission along data bus 110 during data write operations of the memory device 106. In some embodiments, the serializer-deserializer may be configured to translate parallel data bits (e.g., a parallel bit stream) into serial data bits (e.g., a serial bit stream) during read operations of the memory device 106 for transmission along a respective signal line of the data bus 110. As such, the serializer-deserializer may be configured to translate data received from, for example, memory controller 104 or processor 102 having a serial format into a parallel format suitable for storage at the memory array 128. In some embodiments, the serializer-deserializer may be configured to translate data received from, for example, memory array 128 having a parallel format into a serial format suitable for transmission to memory controller 104 or processor 102. In further examples, at least some of the transceivers 134 of the data interface 130 can be configured to include a serializer-deserializer, as described herein with respect to data interface 122.

In some embodiments, each transceiver 134 may include a receiver and transmitter (not shown in FIG. 1). During the write operation, memory controller 104 may be configured to transmit the DQ data signals as DQ data in a serial form (e.g., by serializing the DQ data signals via a corresponding serializer) across data bus 110 to the receiver at a corresponding transceiver 134 of data interface 122. The DQ data may be received at the DQ connector and provided to the receiver. The receiver may be configured to perform one or more operations on the DQ data (e.g., amplification, driving of the data signals, etc.) and/or may operate as a latch for the DQ data until reception of a respective DQS signal that operates to coordinate (e.g., control) the transmission of the DQ data, for example, to a deserializer of the serializer-deserializer. The deserializer may be configured to convert (e.g., translate) the DQ data from a format (e.g., a serial format) in which the DQ data is transmitted along data bus 110 into another format (e.g., a parallel format), in some examples, for transmission along local memory bus 132 to the memory array 128 for storage therein.

In some embodiments, such as during the read operation (e.g., reading stored data from memory array 128 and transmitting read data as read DQ data to memory controller 104 or processor 102 via data bus 110), a serializer of the serializer-deserializer at data interface 122 may be configured to receive the read DQ data from memory array 128 in one format (e.g., a parallel format) and convert (e.g., translate) the read DQ data into a second format (e.g., a serial format), such that the read DQ data may be transmitted to memory controller 104 or processor 102. In some embodiments, the converted DQ data may be configured to be transmitted from the serializer to the transmitter, whereby one or more operations on the converted DQ data (e.g., de-amplification, driving of the data signals, etc.) may occur. For example, during the read operation, a transmitter of transceiver 134 may be configured to transmit the DQ data signals as DQ data in a serial form across data bus 110 to a receiver at a corresponding transceiver 134 of data interface 130.

In some embodiments, the DQ data received at the corresponding transceiver 134 of data interface 130 via data bus 110 from memory device 106 may be distorted. For example, the DQ data received at the corresponding transceiver 134 of data interface 130 may be affected by ISI in which previously received DQ data at the corresponding transceiver 134 of data interface 130 interferes with subsequently received DQ data. For example, the DQ data received at the corresponding transceiver 134 of data interface 130 may be distorted relative to the DQ data transmitted by memory device 106 to memory controller 104. To mitigate (e.g., offset or cancel) this distortion, the corresponding transceiver 134 of data interface 130 may be configured with a time-based equalizer 136. The time-based equalizer 136 may effectively reverse the effects of ISI by applying time-based equalization operations to the distorted DQ data. In some embodiments, the receiver of the corresponding transceiver 134 of data interface 130 may be configured with time-based equalizer 136. In some embodiments, one or more receivers of transceivers 134 of data interface 122 at memory device 106 may be configured with time-based equalizer 136. As such, although examples are presented herein with time-based equalizer 136 being implemented at memory controller 104, in other examples, the time-based equalizer 136 may be implemented at memory device 106. Moreover, although time-based equalizer 136 is illustrated in the example of FIG. 1 being implemented within memory device applications, such as a DDR5 or GDDR6 application, the time-based equalizer 136 presented herein should not be limited or construed to only memory device applications. As such, time-based equalizer 136 may be implemented on any device that receives data on a transmission line from another device that can be distorted by ISI.

In some embodiments, time-based equalizer 136 may be configured as a time-based DFE. Time-based equalizer 136 may include multiple taps. By way of example, time-based equalizer 136 may include three taps. Each tap may be implemented as a delay cell. In further examples, each delay cell may be implemented in parallel to receive a transmitted bit n. In some examples, the transmitted bit n may be referred herein as an input signal. When a data bit is received at the corresponding transceiver 134 of data interface 130, the data bit may be identified as bit "n" and may be received at time t0, as a distorted bit n (e.g., bit n having been distorted by ISI). The most recent bit received prior to the distorted bit n, e.g., received at time of t1 preceding time t0, may be identified as n-1. In some embodiments, each received data bit of the DQ data transmitted via data bus 110 from memory device 106 may be stored as sampled data at a sample register (e.g., a data register or a data latch) (not shown in FIG. 1). The sample register may be employed to store received data bits and may be latched or transmitted along paths (e.g., signal lines) from the sample register to time-based equalizer 136.

In some embodiments, a second most recent bit received prior to the distorted bit n at the transceiver 134 of the data interface 130, e.g., received at time t2 may be identified n-2, and may be transmitted along a corresponding path to time-based equalizer 136 from the sample register. A third most recent bit received prior to the distorted bit n at transceiver 134 of data interface 130, e.g., received at time t3 may be identified as n-3, and may be transmitted along a corresponding path to the time-based equalizer 136 from the sample register. The bits n-1, n-2, and n-3 can be referred to as interfering bits that can interfere and thus distort the received bit n (e.g., the bits n-1, n-2, and n-3 can cause ISI to transmitted bit n over data bus 110 from the memory device 106). In some examples, the bits n-1, n-2, and n-3 received at time-based equalizer 136 may be referred to previously received input signals. Time-based equalizer 136 may be configured to implement a given number of taps based on a determined number of previous bits that interfere with the transmitted bit n. Thus, in examples, wherein three previous bits (e.g., the bits n-1, n-2, and n-3) have been determined to cause ISI to the transmitted n, time-based equalizer 136 may be configured with three taps.

In some embodiments, to mitigate the distortion caused by the group of bits preceding the transmitted bit n, such as the bits n-1, n-2, and n-3, time-based equalizer 136 may be configured to receive the transmitted bit n (e.g., the input signal) and the previously detected bits (e.g., the bits n-1, n-2, and n-3) from the sample register. Based on the previous bits, the input signal may be delayed to implement time-based DFE, thereby enhancing the detection timing and voltage window for detection of the received transmitted bit n. By way of example, each delay cell of time-based equalizer 136 may be configured to receive the transmitted bit n and a corresponding previous received bit. Thus, each delay cell may be configured to receive the transmitted bit n and one of the previously detected bits (e.g., the bits n-1, n-2, and n-3). The previously detected bits may be referred to as feedback bits.

In some embodiments, time-based equalizer 136 may be configured to compensate for the distortion effects caused by at least one previously received input signal on the input signal by time edge shifting respective edges of the input signal based on at least one feedback bit and edge movement signals. Time-based equalizer 136 may be configured to modulate (e.g., time edge shift) the respective edges of the input signal based on the at least one feedback bit and the edge movement signals, such that the respective edges are one of advanced or delayed in time relative to initial edge time locations in time over a bit period or a UI for the input signal.

In some embodiments, the edge movement signals may be provided to time-based equalizer 136 to cause time-based equalizer 136 to implement time edge shifting of a given edge (e.g., a rising edge or a falling edge) of the input signal. Thus, the edge movement signals may specify an edge strength movement of the given edge of the input signal (e.g., an amount in time relative to the initial edge time location that the given edge of the input signal is to be shifted by time-based equalizer 136). The edge movement signals may further specify an edge polarity movement of the given edge of the input signal (e.g., whether the given edge of the input signal is to have a positive time shift, or a negative time shift relative to the initial edge time location in time). The at least one feedback bit may control when in time the time-based equalizer 136 is to implement the edge shifting of the given edge.

In some embodiments, to compensate for ISI, time-based equalizer 136 may be configured to implement time edge shifting with respect to the input signal. Time edge shifting may include a zero-timing offset, a positive timing offset or a negative timing offset. The zero-timing offset may cause the rising edge and the falling edge of the input signal to not be advanced or delayed in time relative to the initial edge time locations of the input signal over the bit period. The positive timing offset may cause the rising edge of the input signal to be delayed in time over the bit period and the falling edge of the input signal to be advanced in time over the bit period. The negative timing offset may cause the rising edge of the input signal to be advanced in time over the bit period and the falling edge of the input signal to be delayed in time over the bit period.

In some embodiments, each of the delay cells of time-based equalizer 136 may be configured to receive the input signal and introduce a corresponding delay, such as one of the positive or negative timing offsets. In some embodiments, outputs of each of the delay cells may be coupled, such that the modulated output signal from each of the delay cells can be combined (e.g., summed) to provide a distortion compensated output signal. As such, time-based equalizer 136 may be configured to shift a waveform of the input signal in time in comparison to voltage-based equalizers that are configured to add and subtract voltage offsets to compensate for the ISI from previously received input signals. Thus, time-based equalizer 136 may be configured to improve an eye performance of transceiver in comparison to voltage-based DFE transceivers. Accordingly, time-based equalizer 136 may be configured to provide for a time-based DFE technique that enables closing of a DFE loop with a greater time margin when compared voltage based DFE techniques.

As discussed above, in DFE, taps are used to equalize the channel loss and improve the "eye". Based on the channel loss at data speed (based on generation), the number of taps is decided, and this number of taps may increase with higher data speeds and higher channel loss. Generally, three taps are used for PCIe Gen3, four to six taps may be used for PCIe Gen4, and more than six taps may be used for PCIe Gen5. These taps may include current steering digital to analog converters (DACs) which may be controlled by the data sampler and adaptation algorithm. For example, in PCIe Gen3, Tap1 has the maximum weighting and Tap3 has the minimum. Tap1 has the minimum settling time (one sampling period) and Tap3 has the maximum sampling time (e.g., three sampling periods).

Figure 2:
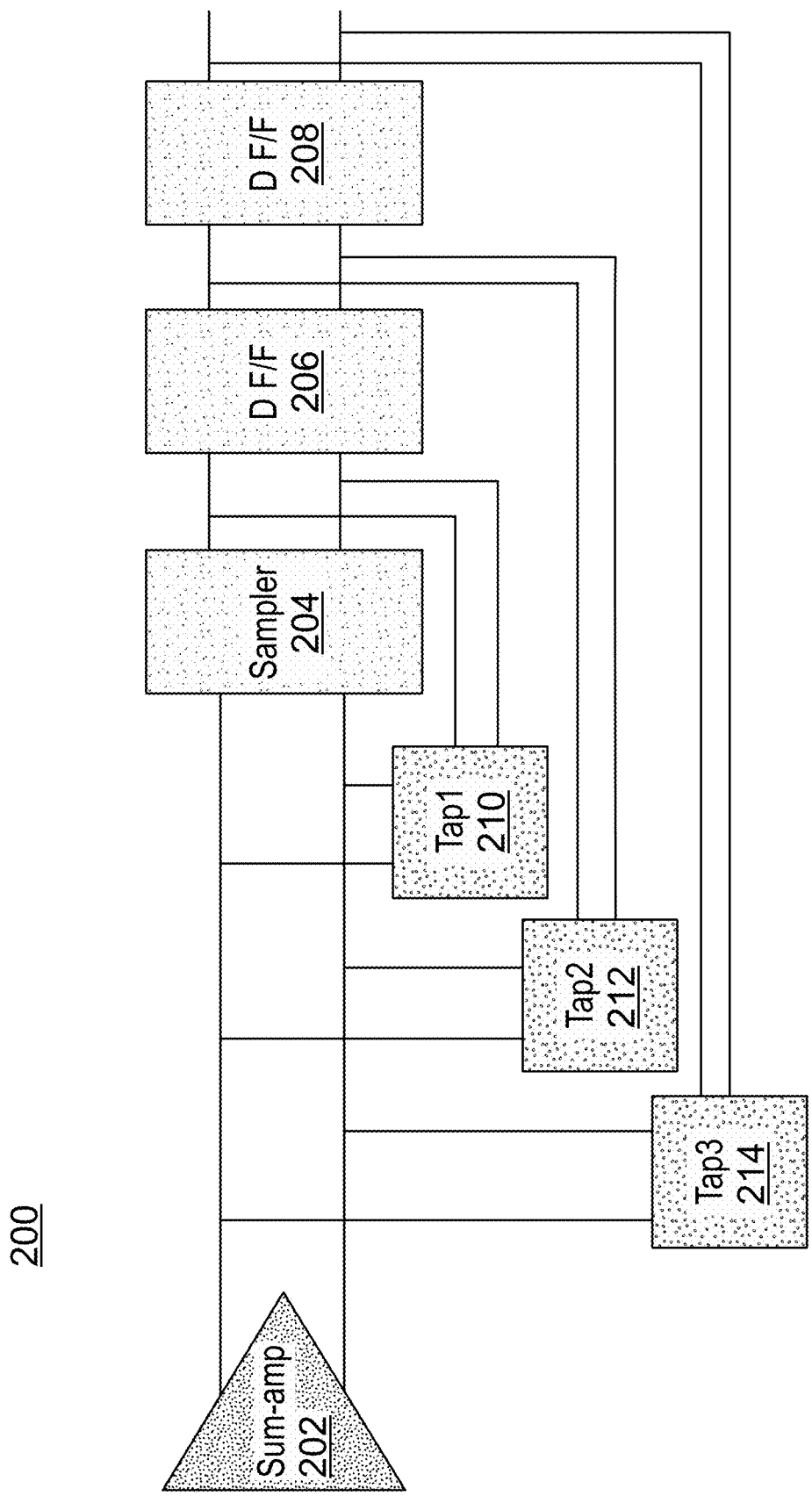
FIG. 2 is a diagram showing an example tap network consistent with embodiments of the present disclosure.

Referring now to FIG. 2, a block diagram illustrating an example tap network 200 is provided. Tap network 200 includes sum amplifier 202, sampler 204, D flip flops 206, 208, and three taps 210, 212, and 214. In a loop unrolled scenario, Tap1 may be included within sampler 204. In operation, input sum amplifier 202 may be the output of a linear equalizer such as a continuous time linear equalizer (CTLE), etc. At sum amp amplifier 202 output Tap1, Tap2, Tap3 correction may be performed to cancel out post cursor ISI so that there is eye opening at the input of the slicer (sampler). Achieving eye opening at the slicer input may be necessary so that the slicer makes the correct decisions. In some embodiments, each tap may have different weightings and different bits may be employed for controlling taps. These taps may be implemented using one or more DACs, which may be controlled by their respective thermometric codes. The sampler may have Tap1 unrolled and the timing loops for Tap1, Tap2, and Tap3 should be settled respectively in one, two, and three sampling periods.

Figure 3:
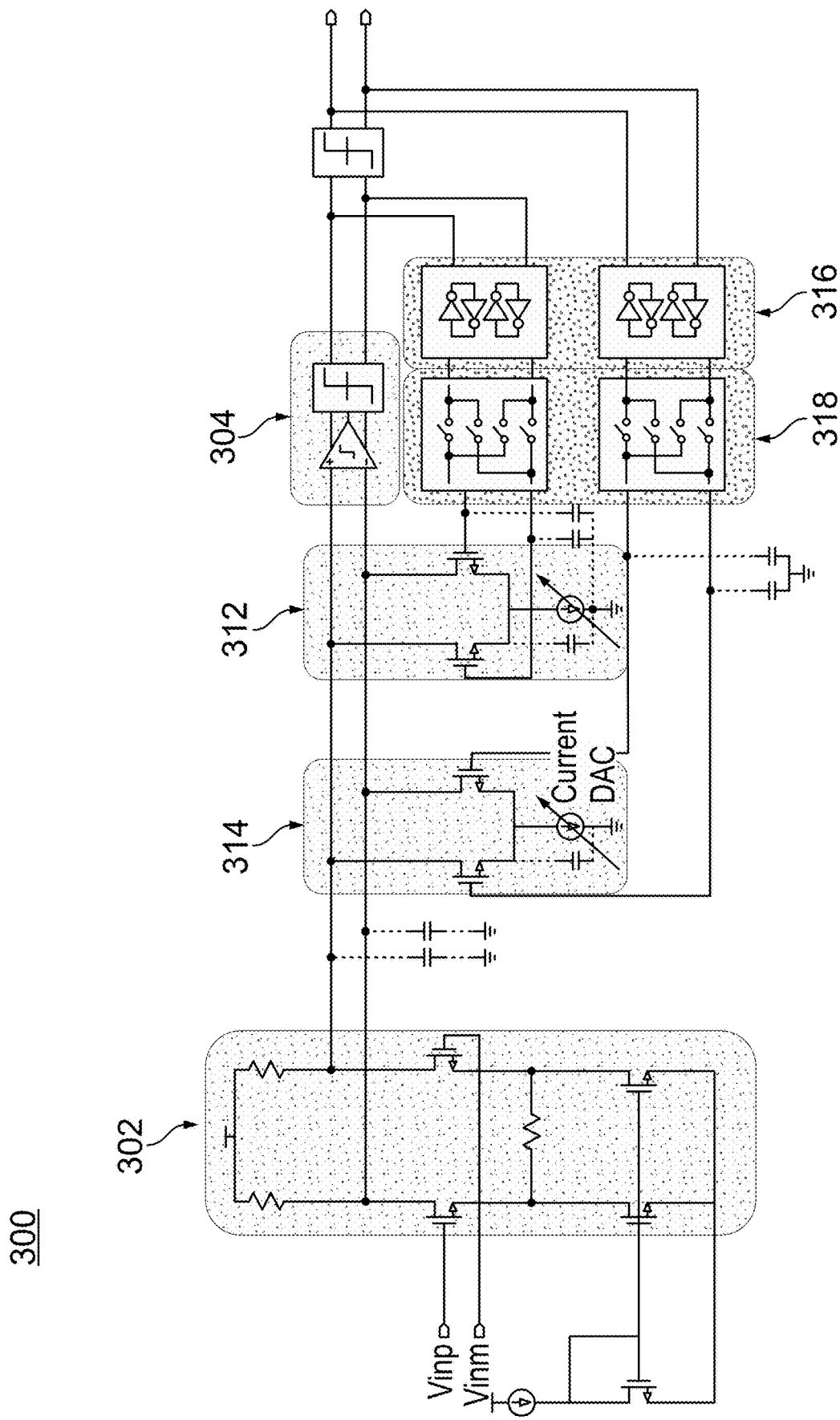
FIG. 3 is a diagram showing an example tap network consistent with embodiments of the present disclosure.
Figure 4:
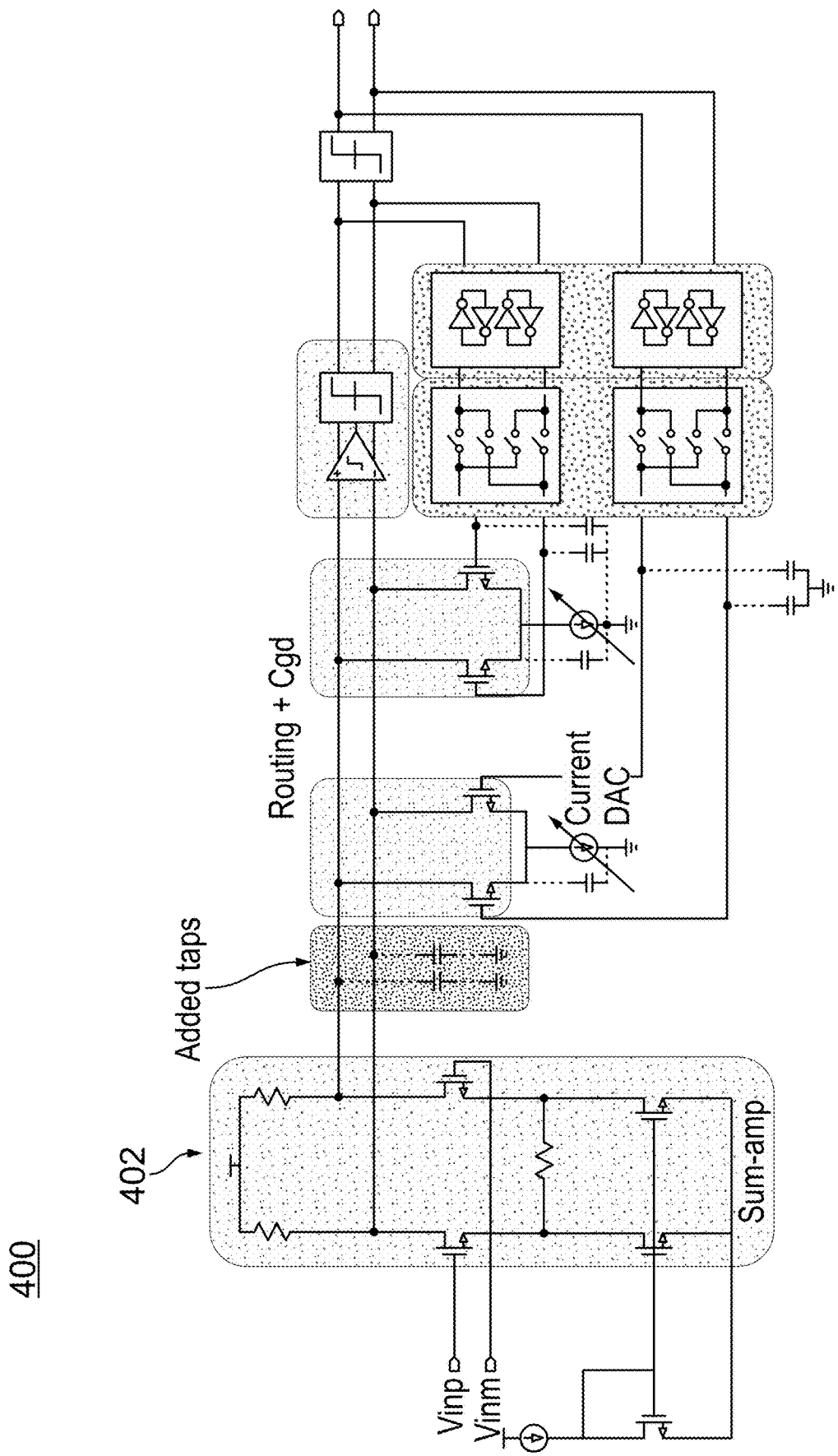
FIG. 4 is a diagram showing an example tap network consistent with embodiments of the present disclosure.

Referring now to FIG. 3, a block diagram illustrating an example tap network 300 is provided. Tap network 300 may include sum amplifier 302, sampler 304 with loop unrolling, Tap2 312, and Tap3 314. In operation, at the output of sum amplifier 302 the tap currents may be added or subtracted to sum amplifier output nodes which, in turn, may cancel the impact of IS. In this example, Tap1 may be unrolled inside sampler 304 itself. Tap2 312 and Tap3 314 correction may be performed in current domain at the output of sum amplifier 302. Latch 316 is provided to hold the data after a sampler decision has been made. One or more sign switches 318 may be used to switch the current between outp/outm nodes based on tap sign bit. The sampler output may be used to steer the current at the output of sum amplifier 302 based upon the previous decision of sampler 304. Tap sign switches 318 may be used since ISI coefficients may be positive or negative so that they may also switch the current direction.

Figure 5:
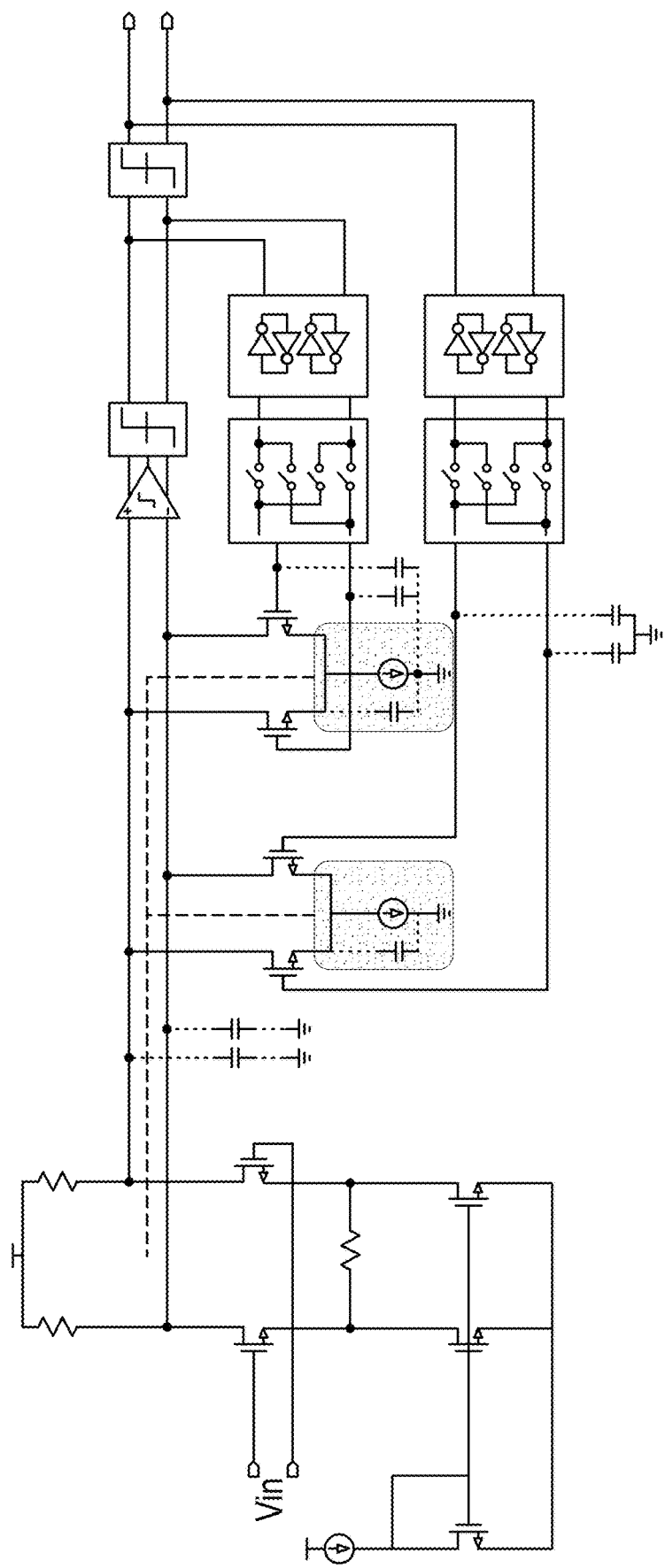
FIG. 5 is a diagram showing an example tap network consistent with embodiments of the present disclosure.
Figure 6:
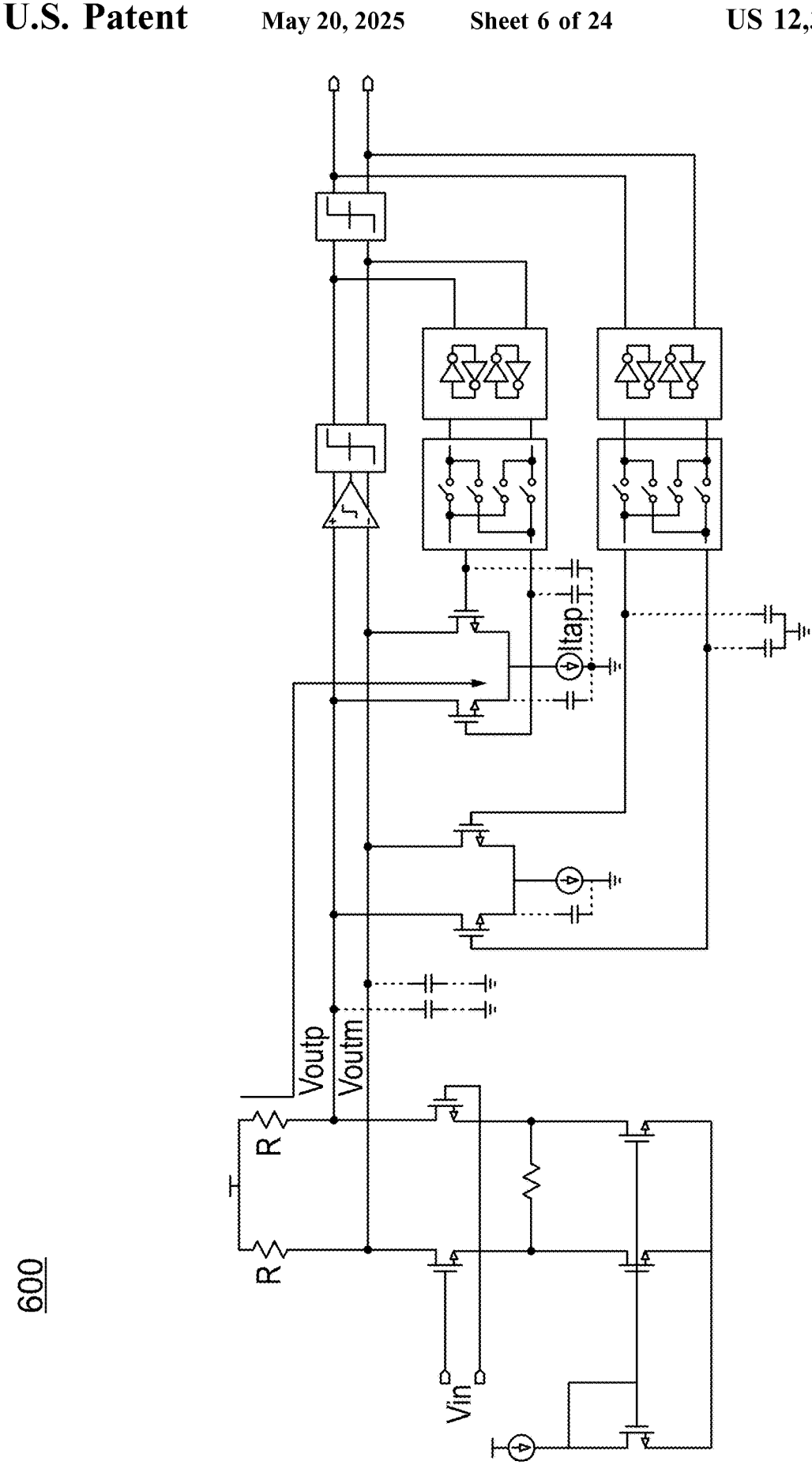
FIG. 6 is a diagram showing an example tap network consistent with embodiments of the present disclosure.
Figure 7:
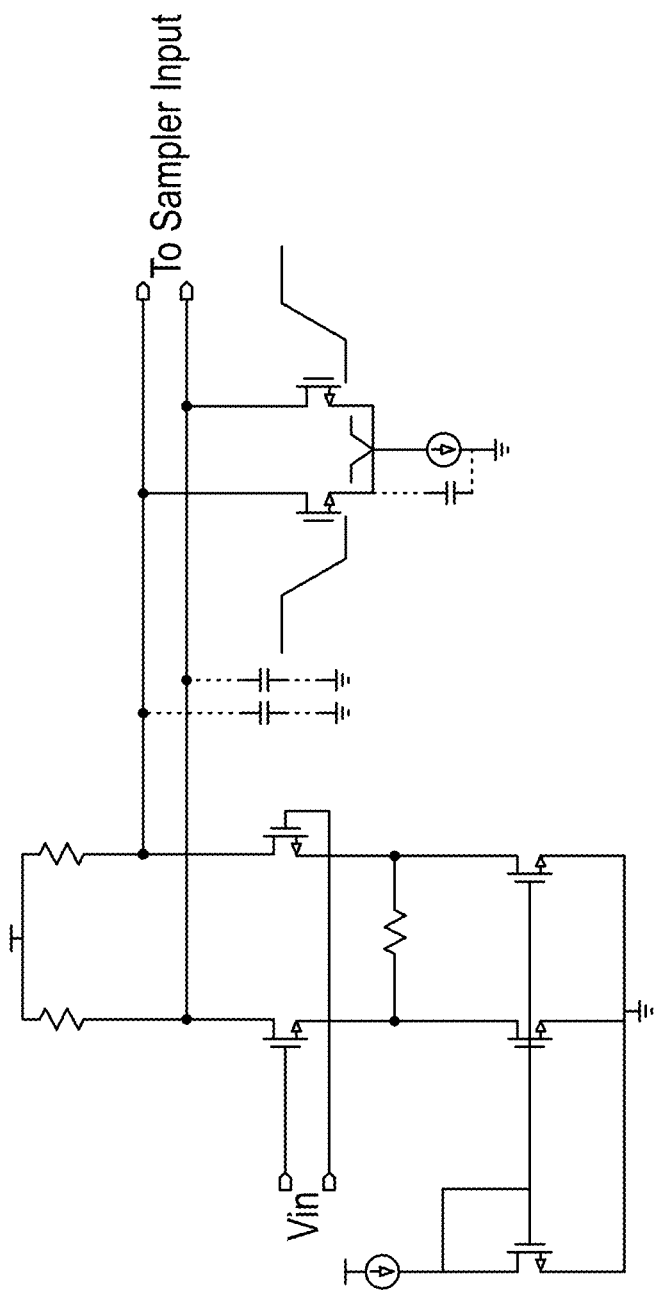
FIG. 7 is a diagram showing an example tap network consistent with embodiments of the present disclosure.

Referring now to FIGS. 4-9, a number of circuits depicting example tap networks in accordance with the embodiments of the present disclosure are provided. Each of these circuits illustrates a particular problem associated with tap networks. As can be seen in the example shown in FIG. 4, as more taps are present within tap network 400, additional routing loads and Cgd from the one or more tap input pairs may load on sum amplifier 402. This may reduce the bandwidth of sum amplifier 402 and the eye opening may degrade at the output of sum amplifier 402. In the example of FIG. 5, a tap network 500 is provided where the linear region of operation of the Tap input pairs will show the source node capacitance of the taps as a load to the output of the sum amplifier. Here, the input of the Tap input pairs is at the CMOS level. As the size of the tap DACs increases, this capacitance also increases. This may reduce the bandwidth of the sum amplifier along with the degradation of the "eye" at the output of the sum amplifier. FIG. 6 depicts a single ended tap network 600. The common mode may decrease because of the current flow in the taps. Here, the common mode drop will be Vcm−Itap*R/2 where Vcm is the output common mode of the sum amplifier, Itap is the tap current, and R is the load resistance of the sum amplifier. In other words, based on the tap currents, the common mode of the sum amplifier reduces, which may degrade the transconductance of the input pair of the sum amplifier in a low voltage scenario. In the example of FIG. 7, a tap network 700 is provided where the data input to the tap inputs are non-overlapping. In the taps, whenever a data reversal occurs, the source node capacitance takes a long time to charge, which may degrade the tap settling time. This non-overlapping may make the source node go down. The more non-overlapping is present, the greater the dip at the source node. Due to the larger dip at the source node, the capacitance at this node may take additional time to get charged and may require more time for the tap voltage to settle at its final value.

Figure 8:
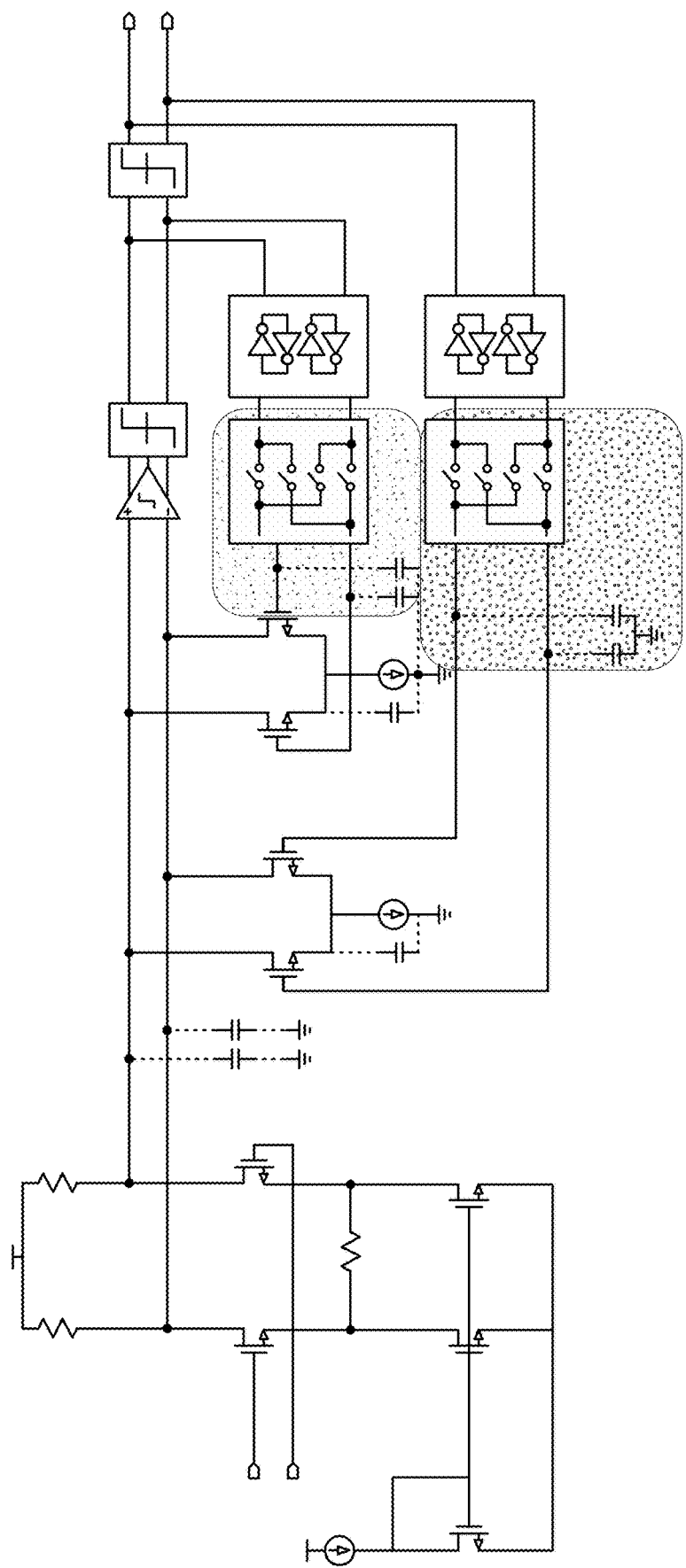
FIG. 8 is a diagram showing an example tap network consistent with embodiments of the present disclosure.
Figure 9:
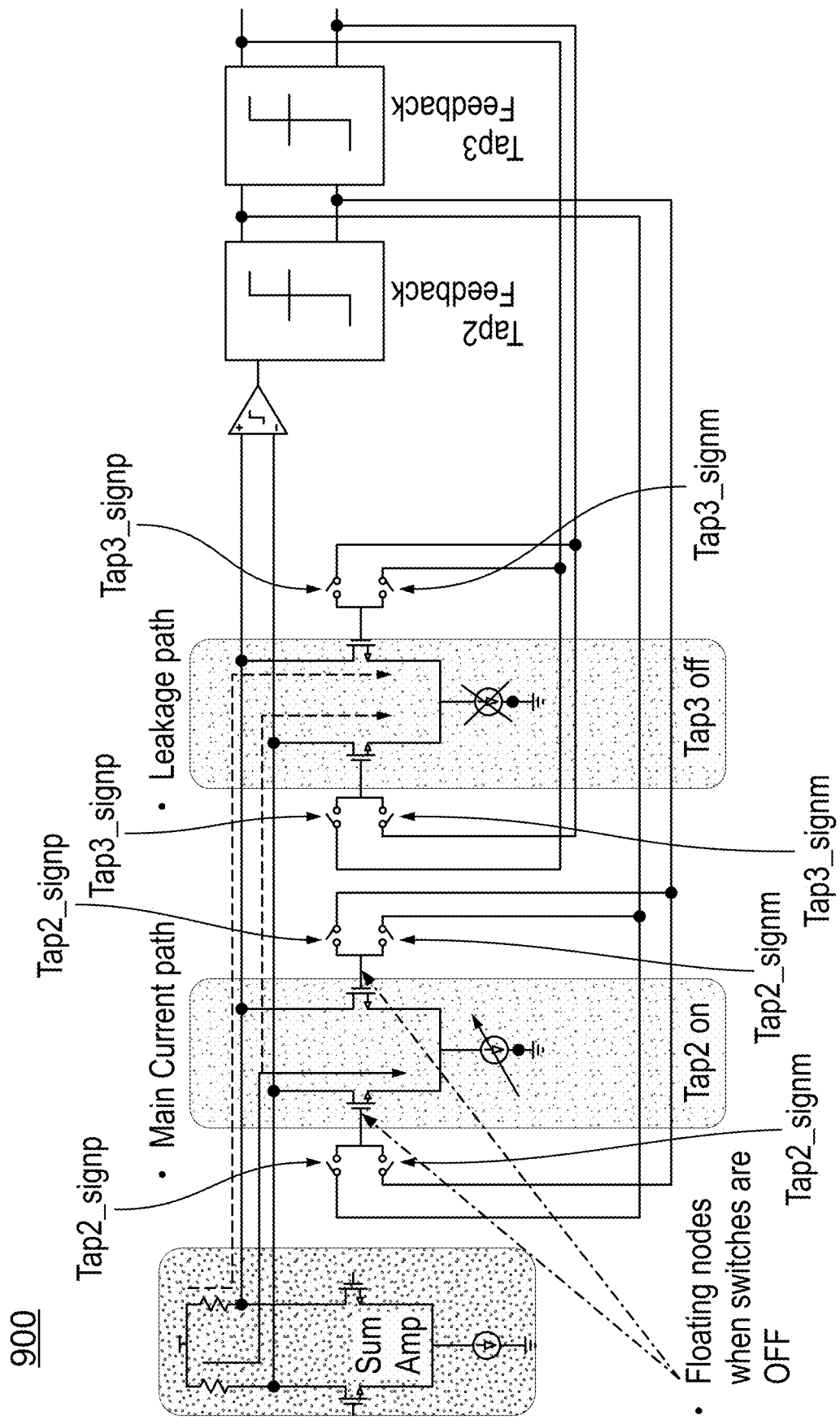
FIG. 9 is a diagram showing an example tap network consistent with embodiments of the present disclosure.

Referring now to FIG. 8, tap network 800 is provided. In this example, the input to the sign detection switches is at the CMOS level. The switch resistance along with the gate capacitance of the tap input pairs may limit the tap settling time. In the example of FIG. 9 the leakage current through the taps that are not active may also act to degrade the tap performance. In operation, as the inputs of Tap3 are toggling, there may be current flow through the switch even though the current source may be off.

Referring now to FIGS. 10-22, embodiments of decision feedback equalization circuits included herein are configured to address these and other issues using a variety of different approaches. In some embodiments, the circuits included herein may move the complete tap network to the source node of the sum amplifier. This may reduce the output loading from sum amplifier. Accordingly, any Tap1 settling may be vastly improved and the eye-opening will be improved at the output of the sum amplifier. Additionally and/or alternatively, the source node capacitance of the tap network will not load the sum amplifier output. The source node settling of the tap network may be removed and adding the tap network at the source node will make the tap settling faster. More specifically, the source node of the sum amplifier is already charged so there is no need to charge the source node capacitance by the tap current. Looking into impedance is 1/gm (where gm is transconductance of the input pair of the sum amplifier) instead of Rload of sum amplifier and the Routing load of the tap network and sum amplifier to sampler routing.

In some embodiments, the decision feedback equalization circuits included herein may be configured to maintain the tap activity differentially. Accordingly, there may be no change at the output common mode of the sum amplifier and no need to have separate common-mode feedback for the sum amplifier. In some embodiments, circuits included herein may alter the positioning of the sign detection switches (e.g., placing them before the latches), which addresses many of the issues of the existing approaches. The input of the sign detection switches are at the CMOS level and the switch resistance along with the gate capacitance of the tap input pair may limit the loop settling time. This is improved by placing sign detection switches before the latches as now the switches will not see the gate capacitance of the tap input pair. Additionally and/or alternatively, in a differential network, a minimum number of current units will always remain ON to counter the leakage impact from OFF tap DACS.

Referring now to FIG. 10, a table 1000 showing example inputs that may be used to control one or more taps is provided. For example, for PCI Gen3, 32 thermometric bits may be used to control the tap currents. These 32 bits may be generated based on an adaptation engine, which may be configured to compensate for channel loss by setting up the equalizer coefficients. Based on the sampler output (either +1/−1), tap current direction through the sum amplifier load will change. In some embodiments, the most significant bit of the tap bits may be used as the tap sign. Based on the tap sign (either +1/−1), the tap current direction through the sum amplifier load will change. As such, there will be four cases based on sampler output and tap sign when dfe_equalization is enabled.

Figure 11:
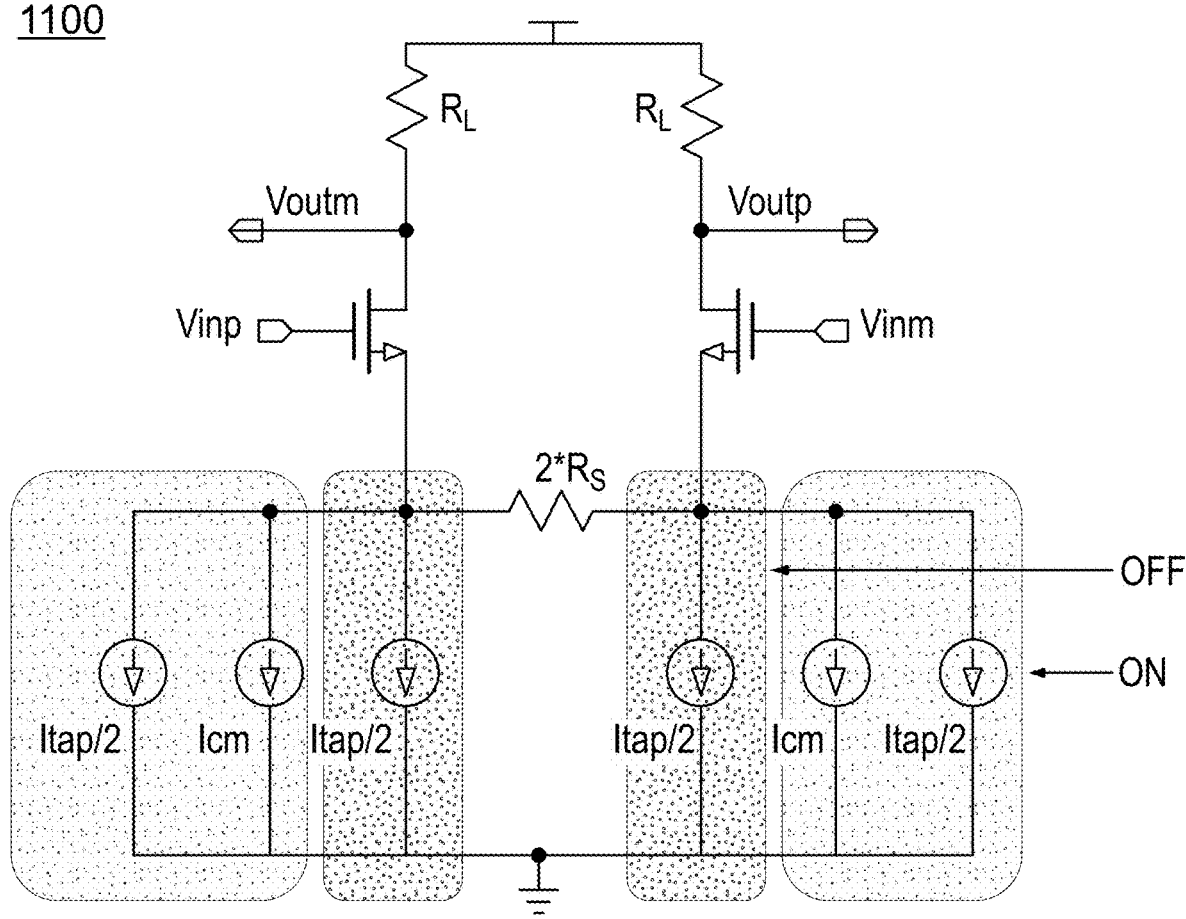
FIG. 11 is a differential tap network architecture consistent with an embodiment of the present disclosure.
Figure 21:
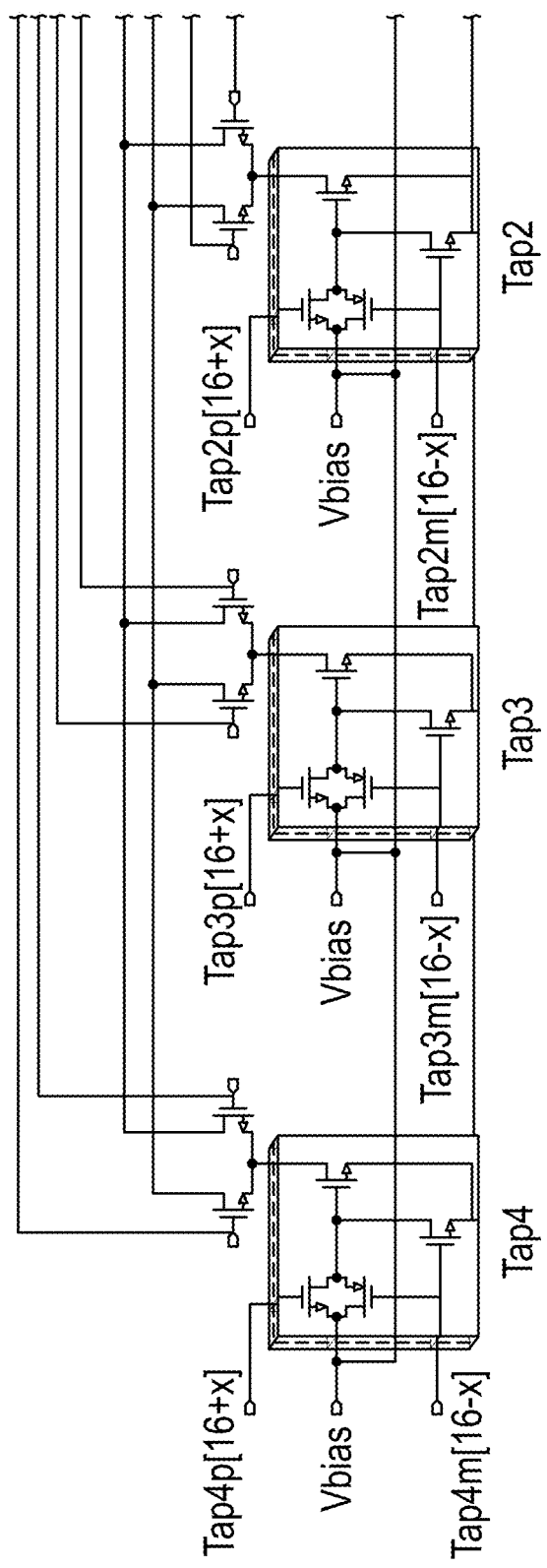
FIG. 21 is an example of a complete architecture showing a four-tap network consistent with an embodiment of the present disclosure.
Figure 21:
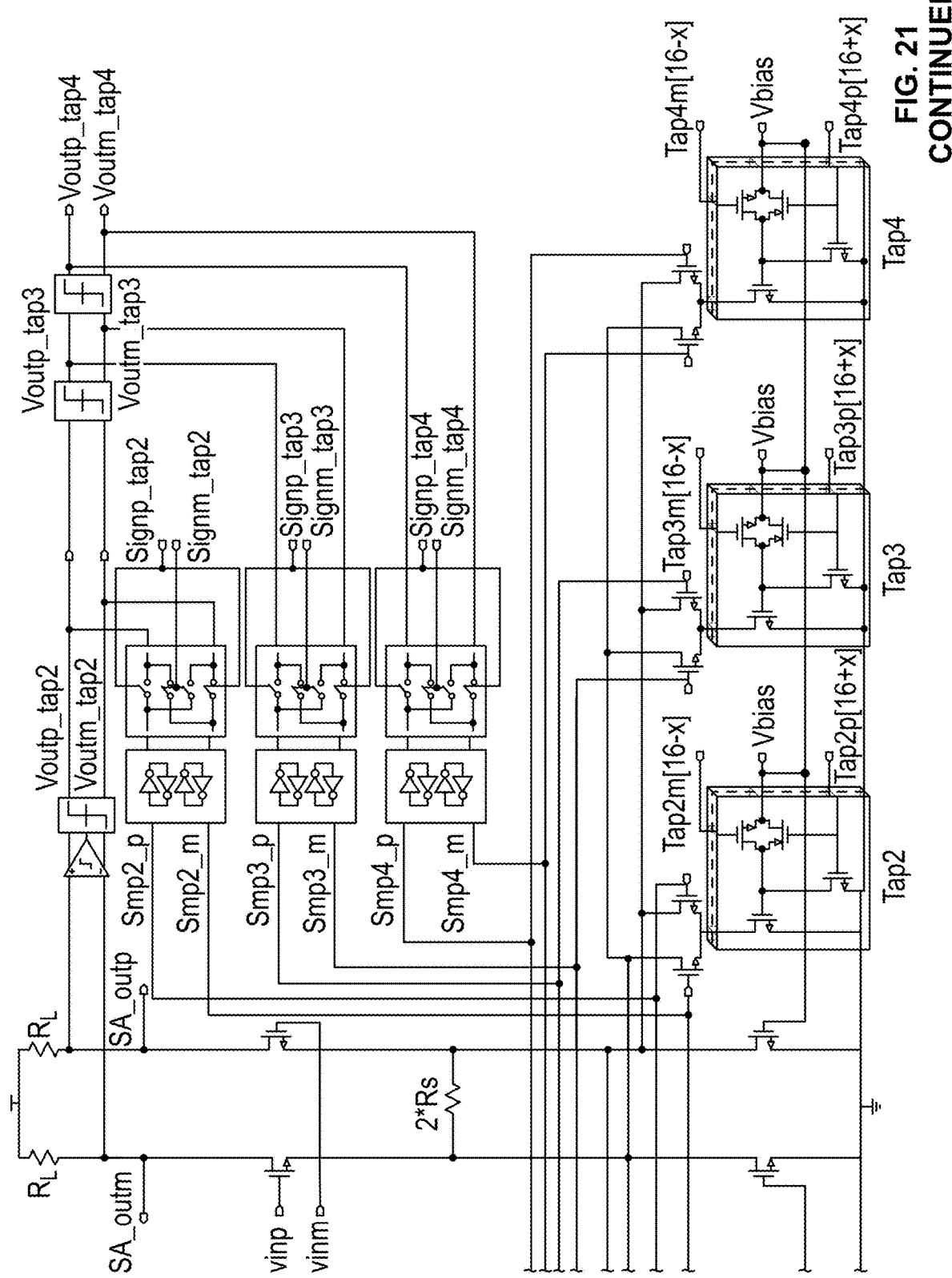

Referring now to FIG. 11, an example differential tap network architecture circuit 1100 is provided. Circuit 1100 may include a sum amplifier 1101 having first resistor 1102 and second resistor 1104. Circuit 1100 may further include first transistor 1106 and second transistor 1108. First transistor 1106 may be electrically connected with first source node 1110 and second transistor 1108 may be electrically connected with second source node 1112. At least one of first source node 1110 and second source node 1112 may be directly connected to a complete tap network (as is shown in FIG. 21). In the example of FIG. 11, only Tap2 is shown, as the rest of the taps may be similar. In all of the cases/modes (as shown in FIGS. 12-15), the common mode current (Icm) may remain electrically connected to source nodes 1110, 1112. One of Itap/2 may be disconnected when dfe_eq=0 and one may remain connected (e.g., Dfe_eq=0; dfe_equalization is disabled). The output of the common mode may be VCM=VDD−(Icm+Itap/2)*RL. Half of the tap weighting will control the tap current DACs. In operation, the tap currents may be controlled by the tap sign and may also depend on the sampler output. The thermometric code that controls the tap current may be set by adaptation engine. The thermometric code may go to the tap DACs to implement tap currents differentially and the most significant bit of the thermometric code may decide the tap sign.

Figure 12:
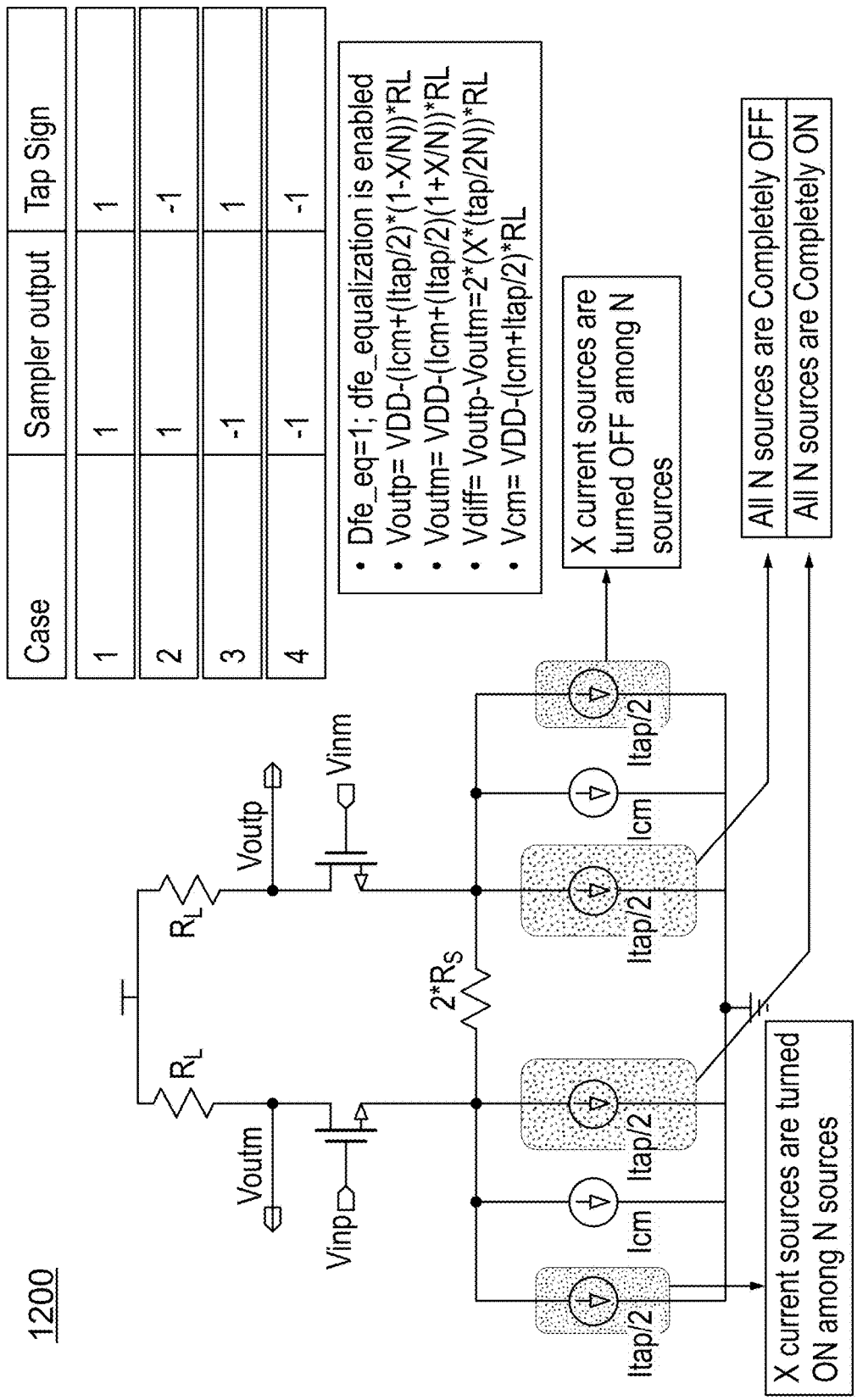
FIG. 12 is a differential tap network architecture consistent with an embodiment of the present disclosure.

Referring now to FIG. 12, an example differential tap network architecture circuit 1200 is provided. In this particular embodiment, tap currents may be implemented as shown in FIG. 12 and it may result in a differential output at the sum amplifier equal to X*(Itap/N)*RL while keeping the common mode at the sum amplifier output the same as in the no DFE equalization scenario (i.e., VDD−(Icm+Itap/2)*RL). The sum amplifier may be configured to maintain activity of the complete tap network differentially in that some or all of the current sources associated with a first portion of the tap network may be turned on while some or all of the current sources associated with a second portion of the tap network may be turned off as is shown in FIG. 12.

Figure 13:
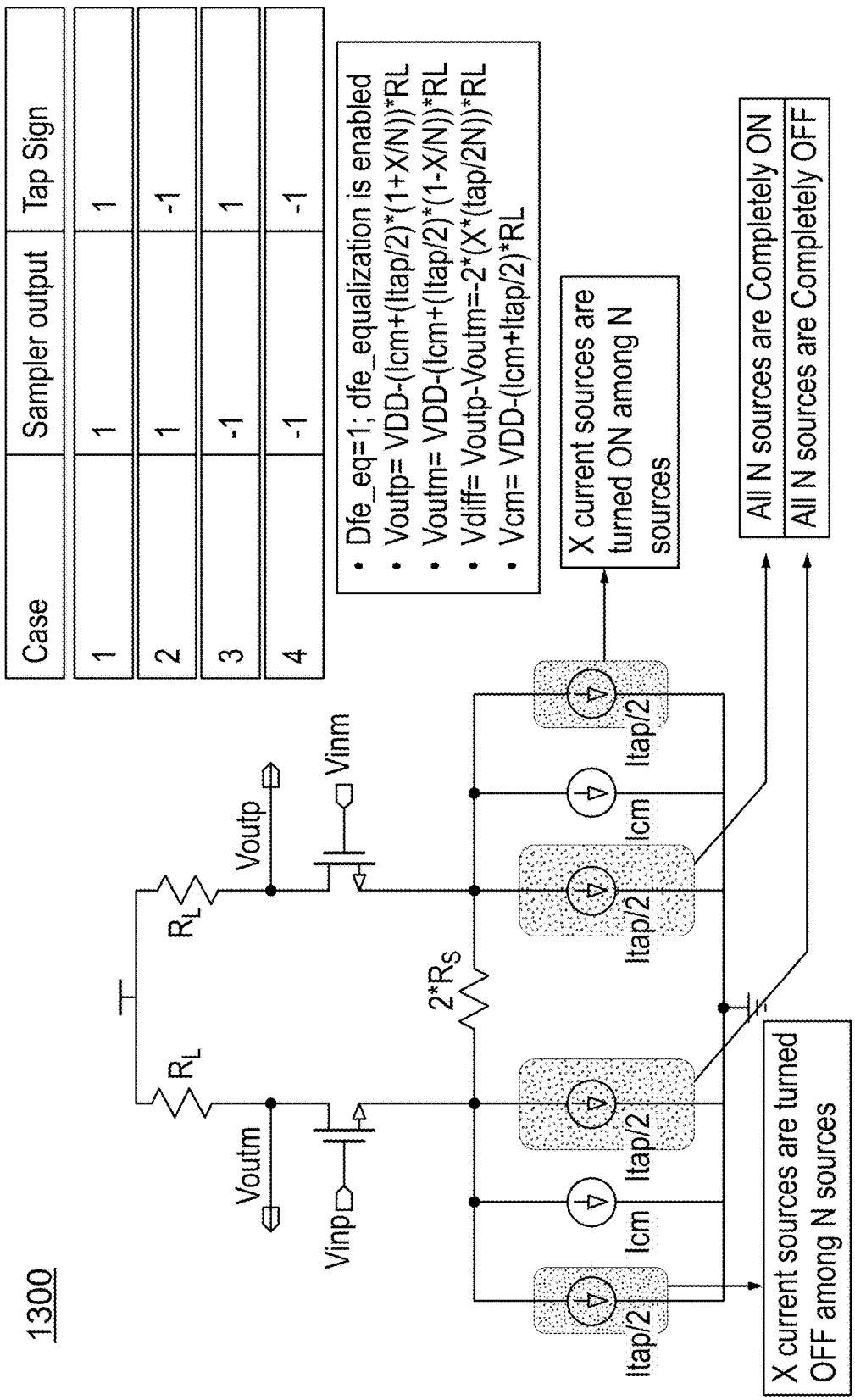
FIG. 13 is a differential tap network architecture consistent with an embodiment of the present disclosure.

Referring now to FIG. 13, an example differential tap network architecture circuit 1300 is provided. In this particular embodiment, tap currents may be implemented as shown in FIG. 13 and it may result in a differential output at the sum amplifier equal to X*(Itap/N)*RL while keeping the common mode at the sum amplifier output the same as in the no DFE equalization scenario (i.e., VDD−(Icm+Itap/2)*RL).

Figure 14:
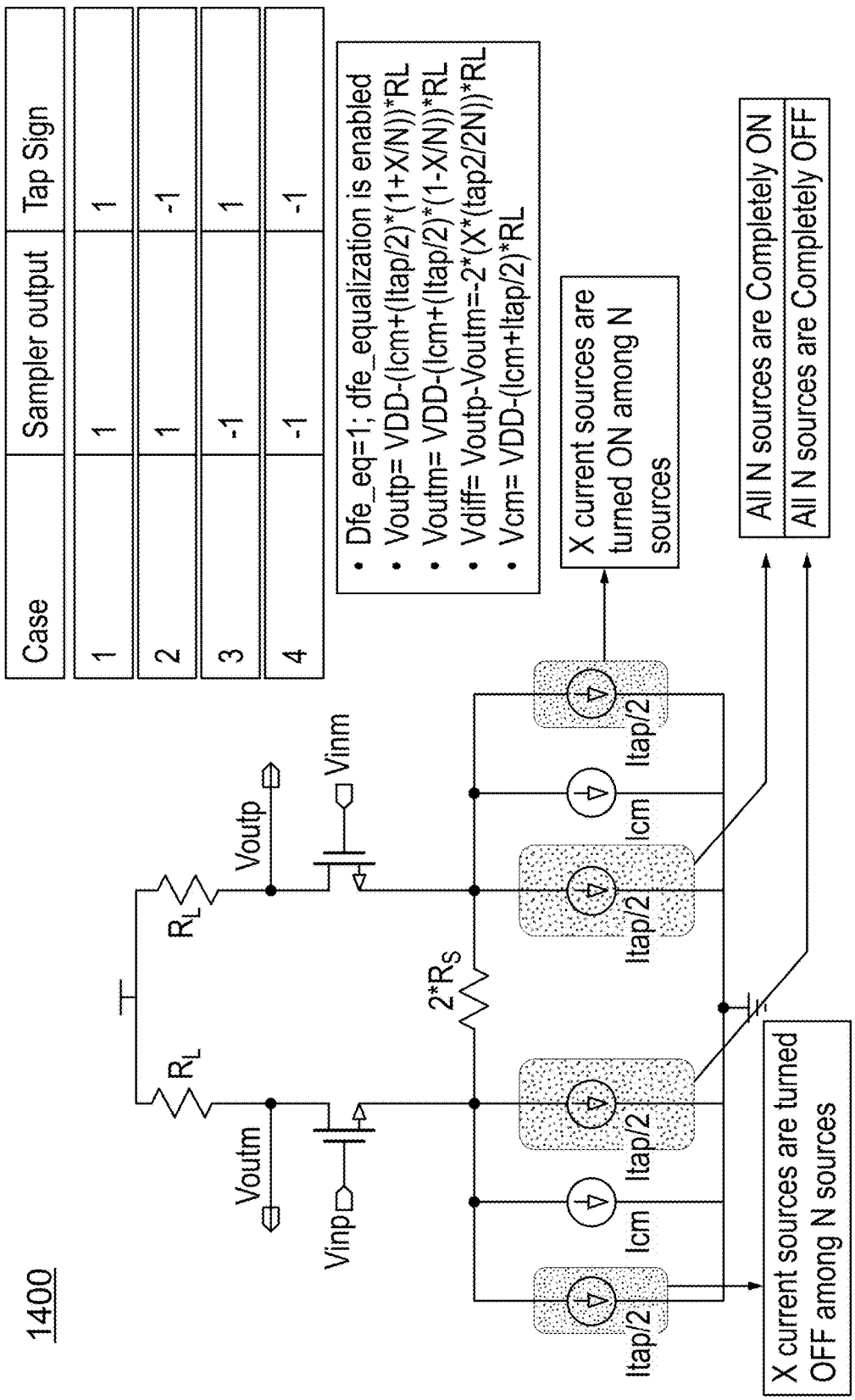
FIG. 14 is a differential tap network architecture consistent with an embodiment of the present disclosure.

Referring now to FIG. 14, an example differential tap network architecture circuit 1400 is provided. In this particular embodiment, tap currents may be implemented as shown in FIG. 14 and it may result in a differential output at the sum amplifier equal to X*(Itap/N)*RL while keeping the common mode at the sum amplifier output the same as in the no DFE equalization scenario (i.e., VDD−(Icm+Itap/2)*RL).

Figure 15:
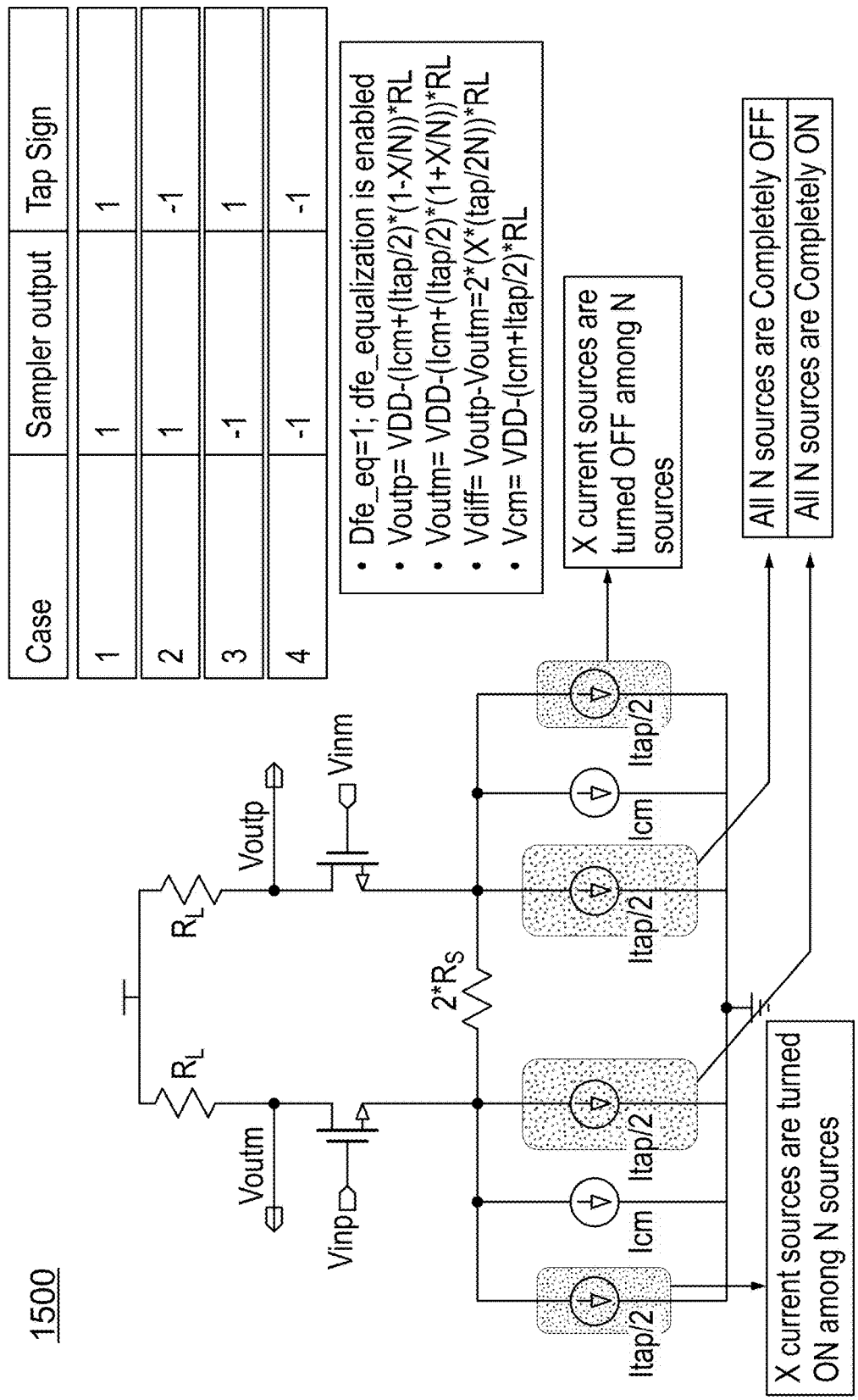
FIG. 15 is a differential tap network architecture consistent with an embodiment of the present disclosure.

Referring now to FIG. 15, an example differential tap network architecture circuit 1500 is provided. In this particular embodiment, tap currents may be implemented as shown in FIG. 15 and it may result in a differential output at sum amplifier equal to X*(Itap/N)*RL while keeping the common mode at the sum amplifier output the same as in the no DFE equalization scenario (i.e., VDD−(Icm+Itap/2)*RL).

Figure 16:
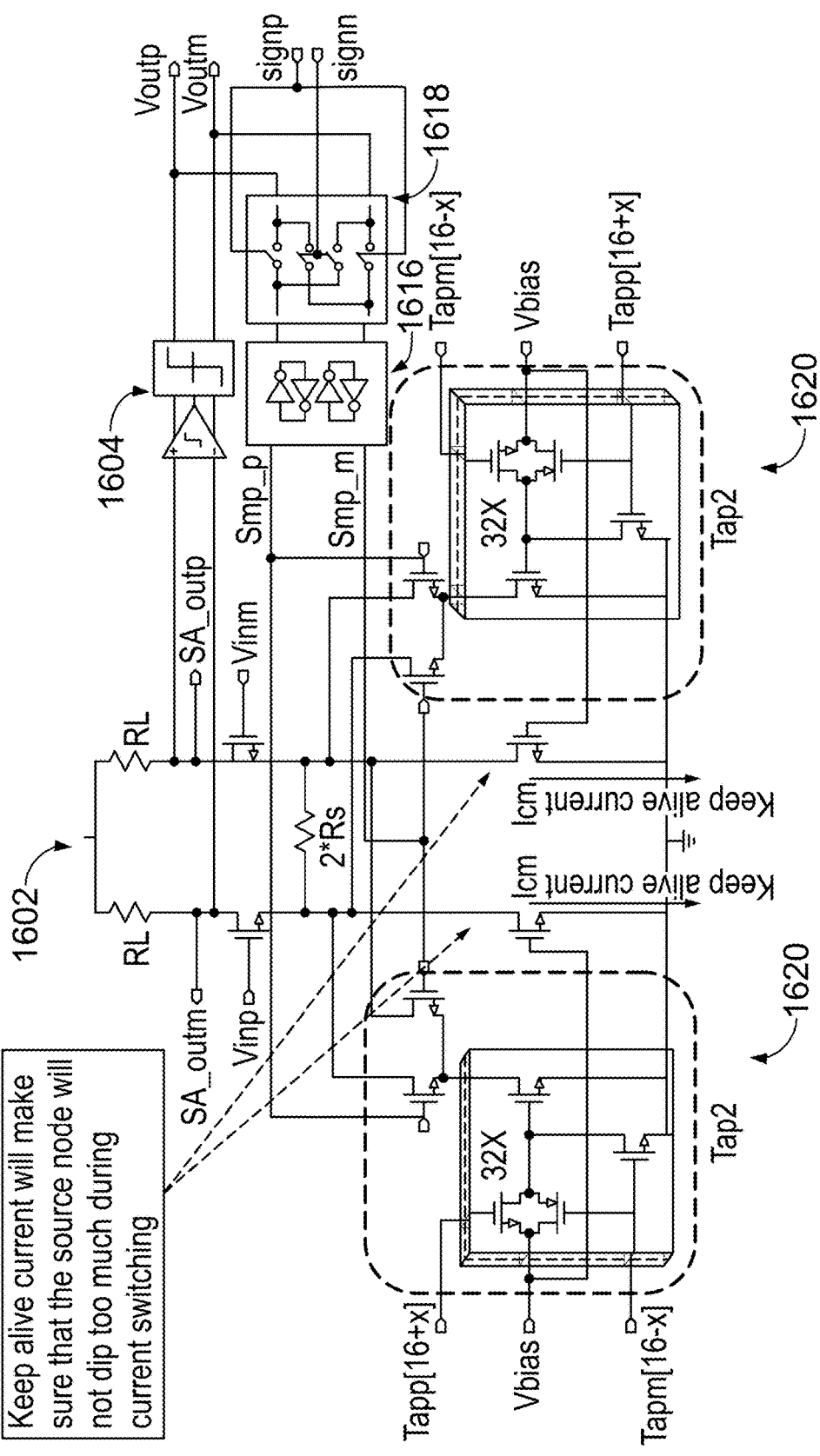
FIG. 16 is a differential tap network architecture consistent with an embodiment of the present disclosure.

Referring now to FIG. 16, an example differential tap network architecture circuit 1600 is provided. FIG. 16 includes sum amplifier 1602, sampler 1604, sign detection switches 1618, latches 1616 and tap network 1620. Sign detection switches 1618 may be configured to generate an output, which may be received latches 1616. In some embodiments, tap network may be directly connected at the source node of sum amplifier 1602. Tap network includes DAC current units which may be controlled by one or more thermometric bits. In some embodiments, there may be a separate tail current Icm which does not depend on the tap currents and will make sure that tail node voltage does not decrease much when tap currents are switching. The value of Smp_P and Smp_m nodes may depend on both the sampler output and sign bit. Based upon the value of Smp_P and Smp_m nodes the tap currents may be switched between the currents of voutp and voutm nodes. Based on these currents a differential output at sum amplifier 1602 may be generated which assists in cancelling the ISI impact.

Figure 18:
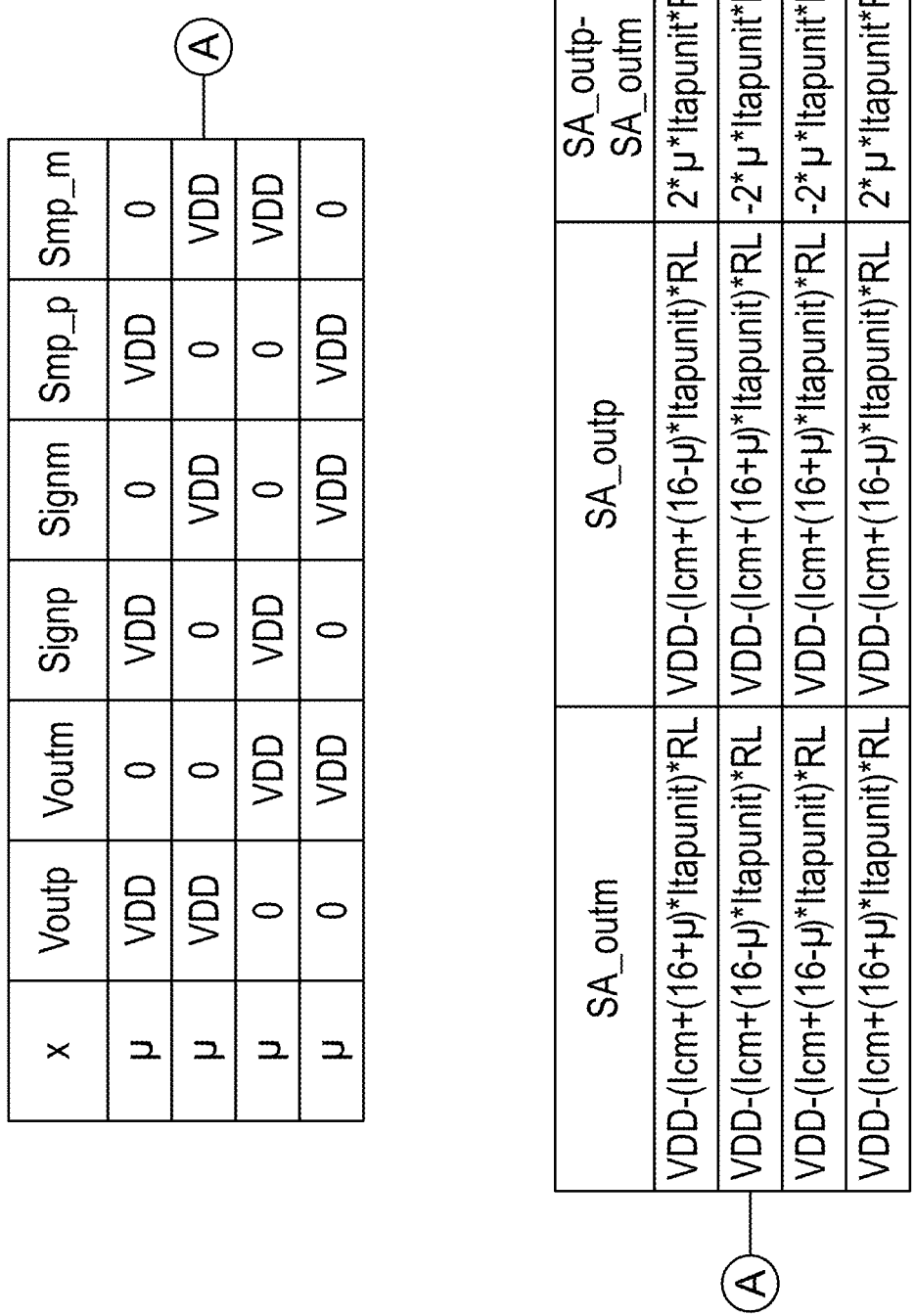
FIG. 18 is a table an example implementation for Tap2 consistent with an embodiment of the present disclosure.

FIGS. 17-18 show tables 1700, 1800 depicting a Tap2 implementation for 32 thermometric bits. While certain examples included herein refer to 32 thermometric bits it should be noted that any number of bits may be used without departing from the scope of the present disclosure (e.g. 16, 32, etc.).

Referring now to FIG. 19A, a table 1900 showing an example node status when dfe_equalization is disabled is provided. In operation, when dfe_equalization=0, tap currents will not be adapted, which means X=0. Signp and signm may be in a high impedance state. Voutp and Voutm may be of any value between VDD and gnd based on the sum amplifier output. Along with Icm, the 16-tap unit current may flow through the sum amplifier source node for Tap2.

Referring now to FIG. 19B, a table 1950 showing an example node status when dfe_equalization is enabled but tap<0>=0 is provided. In this example, Tap<0>=0 indicates that the respective tap is disabled. Here, the process may need to completely turn OFF the feedback path from sampler 1604 to the tap DAC through sign switches 1618, otherwise there may be unnecessary switching at the source node of sum amplifier 1602. FIG. 19A represents that dfe equalization is disabled and FIG. 19B represents when dfe equalization is enabled but all taps are zero. Accordingly, the output of sum amplifier 1602 should remain the same in both cases.

In some embodiments, the decision feedback equalization circuits included herein may utilize a sign-switch network. Accordingly, the sign of any tap may depend on its MSB value. If a 32 bit <31:0>(thermometric) current DAC is designed for Tap2, the sign of Tap2 may be determined by tap2<31> and the sign of Tap3 may be determined by tap3<31>. If tap<31>=1 (VDD), then Signp=1(VDD) and signm=0 (agnd). If tap<31>=0, then Signm=1 (VDD) and signp=0 (agnd). Tap<0>=0 may indicate that the respective tap is disabled.

Figure 20:
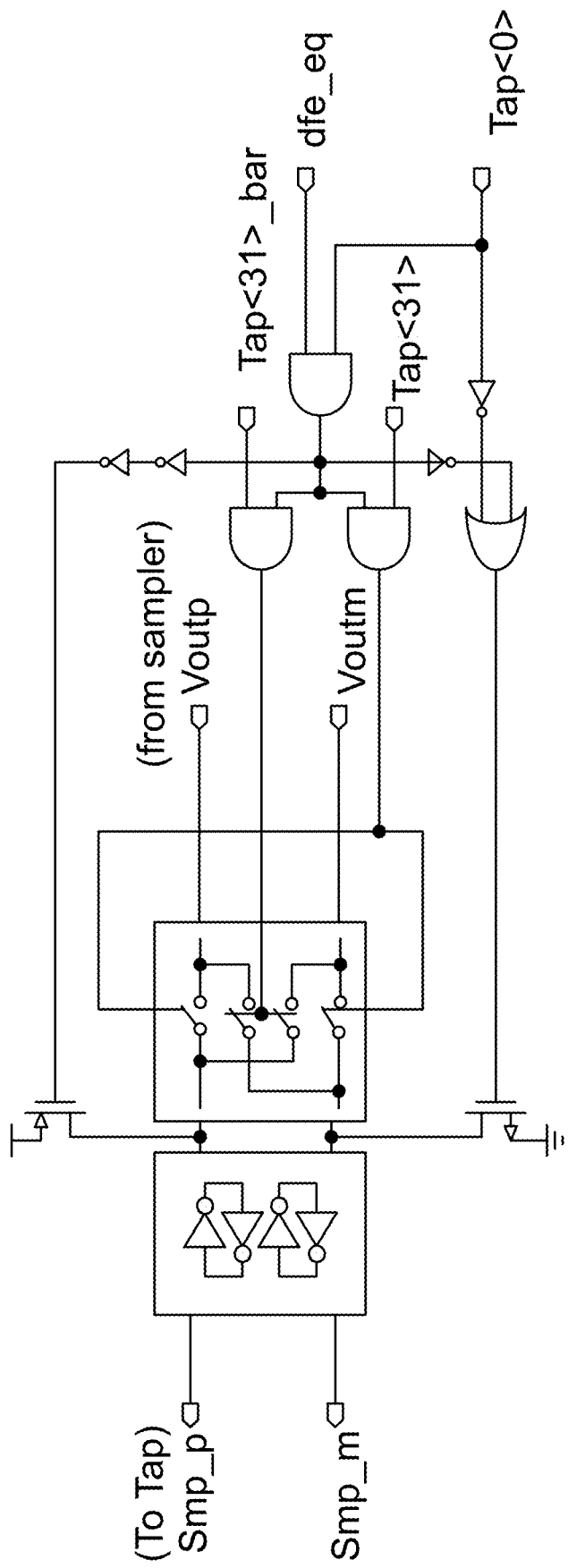
FIG. 20 is a circuit showing tap and sign control bits consistent with an embodiment of the present disclosure.

Referring now to FIG. 20, a circuit 2000 depicting an example showing tap and sign control bits is provided. In some embodiments, tap control will ensure that when dfe_eq=0, smp_p=1 and smp_m=0 and bias current through each sum_amp arm is Icm+16*Itapunit. Similarly, when dfe_eq=1 and tap<0>=0, smp_p=1 and smp_m=0 and bias current through each sum_amp arm is Icm+16*Itapunit. The source node of the tap switch pair may always remain precharged.

Referring now to FIG. 21, a circuit 2100 depicting an example showing a complete architecture for a four-tap network is provided. Additional detail regarding the operation of each individual tap is provided in FIGS. 11-16 described above.

Referring now to FIG. 22, a flowchart showing operations consistent with embodiments of the decision feedback equalization method is provided. The method may include providing 2202 a sum amplifier having a differential tap network architecture wherein the sum amplifier includes at least one resistor, at least one transistor, and at least one source node. The method may further include directly connecting 2204 the at least one source node to a complete tap network. Numerous other operations are also within the scope of the present disclosure as discussed above.

Embodiments of the present disclosure address numerous issues inherent in existing systems. With regard to sum amplifier loading, the circuits included herein improve sum amplifier bandwidth and improve the eye at the sum amplifier output. The common mode output of the sum amplifier does not require a common mode feedback loop and does not change with the change in the tap current. The impact of the source node capacitance at the tap network is removed which further improves the settling at the sum amplifier output. Tap network settling is far faster than under existing approaches. Instead of RL, tap currents need to charge or discharge the source node of the input pair which has a resistance of 1/gm. The sign switches may be placed inside the sampler, which improves the settling time of the tap switches. Tap DACs may be controlled by tap<0> bit, which reduces any current leakage problem when some of the taps are off based on channel or protocols.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A decision feedback equalization circuit, comprising:
 a sum amplifier having a differential tap network architecture, wherein the sum amplifier includes at least one resistor, at least one transistor, and at least one source node, and wherein the at least one source node is directly connected to a complete tap network, wherein the complete tap network is operatively connected with one or more sign detection switches configured to generate an output.

2. The decision feedback equalization circuit of claim 1, wherein the at least one source node is configured to allow a common mode current to flow therethrough.

3. The decision feedback equalization circuit of claim 1, wherein the sum amplifier does not include a common mode feedback loop.

4. The decision feedback equalization circuit of claim 1, wherein the sum amplifier is configured to maintain activity of the complete tap network differentially.

5. The decision feedback equalization circuit of claim 1, wherein the output is received at one or more latches.

6. The decision feedback equalization circuit of claim 1, wherein the complete tap network includes a plurality of current sources.

7. The decision feedback equalization circuit of claim 1, wherein the complete tap network includes multiple taps wherein each tap is controlled using 16 or 32 thermometric bits.

8. The decision feedback equalization circuit of claim 1, wherein the complete tap network includes at least 3 taps.

9. The decision feedback equalization circuit of claim 1, wherein each tap of the complete tap network includes a digital to analog converter.

10. A decision feedback equalization method, comprising:
 providing a sum amplifier having a differential tap network architecture, wherein the sum amplifier includes at least one resistor, at least one transistor, and at least one source node;
 directly connecting the at least one source node to a complete tap network; and
 generating an output at one or more sign detection switches operatively connected with the complete tap network.

11. The decision feedback equalization method of claim 10, further comprising:
 allowing a common mode current to flow through the at least one source node.

12. The decision feedback equalization method of claim 10, wherein the sum amplifier does not include a common mode feedback loop.

13. The decision feedback equalization method of claim 10, wherein the sum amplifier is configured to maintain activity of the complete tap network differentially.

14. The decision feedback equalization method of claim 10, wherein the output is received at one or more latches.

15. The decision feedback equalization method of claim 10, wherein the complete tap network includes a plurality of current sources.

16. The decision feedback equalization method of claim 10, wherein the complete tap network includes multiple taps wherein each tap is controlled using 16 or 32 thermometric bits.

17. The decision feedback equalization method of claim 10, wherein the complete tap network includes at least 3 taps.

18. The decision feedback equalization method of claim 10, wherein each tap of the complete tap network includes a digital to analog converter.

* * * * *